US012669240B2

(12) United States Patent
Shum

(10) Patent No.: US 12,669,240 B2
(45) Date of Patent: Jun. 30, 2026

(54) LIGHT EMITTING DIODE (LED) LUMINAIRE SYSTEMS

(71) Applicant: Frank Shum, Sunnyvale, CA (US)

(72) Inventor: Frank Shum, Sunnyvale, CA (US)

(73) Assignee: Frank Shum

( * ) Notice: Subject to any disclaimer, the term of this patent is extended or adjusted under 35 U.S.C. 154(b) by 0 days.

(21) Appl. No.: 19/239,997

(22) Filed: Jun. 17, 2025

(65) Prior Publication Data

US 2026/0009530 A1 Jan. 8, 2026

Related U.S. Application Data

(60) Provisional application No. 63/668,335, filed on Jul. 8, 2024.

(51) Int. Cl.

*F21V 29/83* (2015.01)
*F21V 23/00* (2015.01)
*F21V 29/15* (2015.01)
*F21V 29/76* (2015.01)
*F21Y 115/10* (2016.01)

(52) U.S. Cl.

CPC ............ *F21V 29/83* (2015.01); *F21V 23/008* (2013.01); *F21V 29/15* (2015.01); *F21V 29/76* (2015.01); *F21Y 2115/10* (2016.08)

(58) Field of Classification Search

CPC .......... F21V 29/83; F21V 29/15; F21V 29/76; F21V 23/008; F21Y 2115/10

USPC .......................................................... 362/294

See application file for complete search history.

(56) References Cited

U.S. PATENT DOCUMENTS 7,824,070 B2 11/2010 Higley et al.
9,581,324 B2 2/2017 Zhai et al.
10,900,652 B2 1/2021 Bryant
11,635,197 B2 * 4/2023 Bendtsen ............ F21V 23/0457 362/249.02
2011/0193463 A1 * 8/2011 Daniel .................... F21V 5/007 313/46
2014/0056001 A1 2/2014 Hsu et al.
2014/0199168 A1 * 7/2014 Spiro .................... F21V 23/007 416/5
2016/0186982 A1 * 6/2016 Xiong .................. F21V 29/506 362/234
2019/0285264 A1 * 9/2019 Jiang ..................... F21V 7/0025
(Continued)

*Primary Examiner* — Laura K Tso

(74) *Attorney, Agent, or Firm* — S.J. INTELLECTUAL PROPERTY LTD.

(57) ABSTRACT

Disclosed is a lighting system comprising a Light Emitting Diode (LED) assembly with one or more LEDs and a driver assembly with a driver that powers the LEDs, both generating heat during operation. A connecting member links the LED assembly and the driver assembly while minimizing thermal conduction between the LED assembly and the driver assembly. The LED assembly is exposed to a first airflow to dissipate heat, and the driver assembly is exposed to a second airflow, with the second airflow's ambient air source substantially separated from the heated air of the first airflow to reduce thermal convection coupling. This design enhances thermal management by isolating the heat dissipation paths, improving efficiency and longevity of the LED and driver components. The lighting system further includes heat sinks and specific arrangements of the assemblies.

14 Claims, 20 Drawing Sheets

(56) References Cited

U.S. PATENT DOCUMENTS

2020/0182452 A1 * 6/2020 Ter-Hovhannisyan ...................... F21V 29/83

* cited by examiner

LIGHT EMITTING DIODE (LED) LUMINAIRE SYSTEMS

TECHNICAL FIELD

The present disclosure generally relates to lighting systems. In particular, the present disclosure relates to an optical emission system, specifically a solid-state lighting system with enhanced overall reliability and performance achieved by improved thermal insulation between light emitting components and their power supply modules.

BACKGROUND

The subject matter discussed in the background section should not be assumed to be prior art merely because of its mention in the background section. Similarly, a problem mentioned in the background section or associated with the subject matter of the background section should not be assumed to have been previously recognized in the prior art. The subject matter in the background section merely represents different approaches, which in and of themselves may correspond to implementations of the claimed technology.

With advancement in technologies associated with lighting systems, optical emission systems have become increasingly prevalent across diverse applications, such as architectural lighting, industrial illumination, automotive systems, consumer electronics, and the like. The optical emission systems are favored over traditional incandescent and fluorescent lighting due to higher energy efficiency, longer operational lifespan, and superior illumination characteristics. An optical emission system typically includes light emitting component(s) such as, but not limited to, Light emitting diode(s) (LED(s)), a power supply module (commonly referred to as a driver), and a cooling mechanism or pathway for managing heat generated during operation. The light emitting component(s) and the power supply module (driver) are mechanically connected by a connecting member. The light emitting component(s) in the optical emission systems convert electrical energy into light more efficiently than traditional lighting systems. However, as a byproduct during conversion of an input electrical energy into light, a significant amount of heat is generated by the light emitting component(s). The power supply module also generates heat during operation of the optical emission systems and effective handling of the generated heat is one of the critical challenges in maintaining the performance and longevity of the optical emission systems.

Both light emitting component(s) and the driver generate heat, and both have a reliability lifetime dependent on temperature. The light emitting components generate a greater total amount of heat, however, the performance and reliability of the light emitting components are less sensitive to temperature variations than that of the driver. In particular, the driver, which houses electrolytic capacitors and other temperature-sensitive components, has a significantly higher thermal sensitivity. The electrolytic capacitors, integral to stabilizing and smoothing an electrical output of switching mode power supplies, exhibit a marked decrease in lifespan with rising temperatures and the operational life of the electrolytic capacitors halves for every 10° C. increase in ambient temperature.

Further, in conventional lighting systems, the light emitting component(s) and the driver are often mechanically connected and thermally coupled, either through direct contact, common housing, or a conductive mounting structure. For example, an aluminium connecting member, chosen for its mechanical strength or compactness, might appear insignificant in terms of physical footprint, but due to aluminium's high thermal conductivity, it acts as a thermal short circuit between the LED and the driver, effectively negating any intended thermal separation.

Heretofore, in prior art implementations, attempts have been made to provide thermal isolation between the LED and the driver. However, these efforts were typically superficial and failed to establish meaningful thermal isolation. Although some lighting systems provided a degree of physical separation, two primary modes of thermal coupling: thermal conduction and thermal convection were often ignored. Even if thermal conduction insulation is partially addressed by physical separation, poor attention to airflow dynamics results in convective heat transfer from the hotter component (usually the LED) to the cooler i.e., the more temperature-sensitive component (the driver), thereby degrading the driver's performance.

Further, in many designs of the lighting systems, airflow intended to cool the LEDs inadvertently passes over the driver, raising its ambient temperature and accelerating thermal aging of its internal components. Although the LEDs may benefit from better cooling due to its proximity to airflow or heat sinks, the driver suffers increased thermal stress. In some lighting systems, the LEDs appear to gain in reliability simply because it is being cooled via a heat sink shared with or in proximity to the driver. However, this configuration compromises the driver's reliability since the driver's temperature sensitivity is greater. This further underscores a fundamental problem in conventional lighting designs i.e., thermal mechanics of the components are not adequately separated, resulting in unwanted thermal interactions. The LED and the driver, despite being distinct functional units with different thermal tolerances, often share the same thermal environment. The shared thermal environment leads to the mutual elevation of temperatures, reducing an overall reliability of the lighting systems.

A practical approach to quantify thermal coupling is to operate the lighting systems with only the driver powered on while keeping the LED off. In well-designed lighting systems with effective thermal isolation, the driver's temperature should remain close to ambient. However, in poorly isolated lighting systems, the driver's temperature continues to be elevated due to residual heat from the LED or inefficient airflow design.

Despite efforts to enhance thermal performance using heat sinks or passive cooling techniques, these conventional solutions fall short of providing complete thermal isolation and often fail to fully address the nuances of thermal conduction and convection coupling between the LED and the driver. As such, these prior systems continue to suffer from premature driver failures, degraded system reliability, and suboptimal performance.

To overcome the above-mentioned challenges associated with conventional LED-based illumination systems, there is a need for an improved lighting system with efficient thermal decoupling of the LED and the driver through both conduction and convection isolation.

SUMMARY

The summary is provided to introduce aspects related to lighting systems and efficient thermal management of the lighting systems, and the aspects are further described below in the detailed description. This summary is not intended to identify essential features of the claimed subject matter nor is it intended for use in determining or limiting the scope of the claimed subject matter.

According to an aspect of the present disclosure, a lighting system is disclosed. The lighting system comprises a Light Emitting Diode (LED) assembly including one or more LEDs, a driver assembly including a driver that powers the one or more LEDs, and a connecting member connecting the LED assembly and the driver assembly. Each of the one or more LEDs and the driver generates heat when in operating condition. The connecting member is adapted to minimize thermal conduction between the LED assembly and the driver assembly. The LED assembly is designed to be exposed to a first airflow that dissipates heat from the LED assembly and the driver is designed to be exposed to a second airflow that dissipates heat from the driver assembly. An ambient air source for the second airflow is substantially separated from the heated air from the first airflow to minimize a thermal convection coupling of the first airflow to the second airflow.

In one or more embodiments, the lighting system further comprises an arrangement including at least one of an LED assembly positioned at least partially surrounding a driver assembly; an LED assembly positioned adjacent to a driver assembly; or at least two LED assemblies positioned on opposite sides of a driver assembly.

In one or more embodiments, a heated air from the second airflow forms at least a portion of the first airflow impinging on the LED assembly.

In one or more embodiments, the lighting system further comprises a first heat sink corresponding to the LED assembly and a second heat sink corresponding to the driver assembly. The first airflow is directed across the first heat sink of the LED assembly, and the second airflow is directed across the second heat sink of the driver assembly. The second heat sink is positioned substantially above the first heat sink. The second airflow is substantially isolated in convention convection from the first airflow.

In one or more embodiments, the connecting member is configured to be formed of one or more portions to minimize the thermal conduction between the LED assembly and the driver assembly. At least one portion of the one or more portions is formed of a low bulk thermal conductivity material.

In one or more embodiments, at least one portion of the one or more portions of the connecting member is formed with a constricted cross section profile.

In one or more embodiments, at least one portion of the one or more portions of the connecting member forms a high thermal contact resistance interface with at least one of other portion of the one of more portions, the LED assembly, or the driver assembly.

In one or more embodiments, the low bulk thermal conductivity material corresponds to a plastic material.

In one or more embodiments, the low bulk thermal conductivity material is a part of an optic of the LED assembly.

In one or more embodiments, a thermal conductivity of the connecting member is lesser than at least one of 5 W/K or 10 W/K.

In one or more embodiments, the LED assembly and the driver assembly are physically separated forming a separation area having a first portion comprising of the connecting member and a second portion comprising of at least an airgap.

In one or more embodiments, the second portion of the separation area corresponds to at least one of 90%, 80%, 70% or 60% of the separation area.

In one or more embodiments, the LED assembly and the driver assembly are initially in a power-off condition, the driver assembly having an initial temperature. The LED assembly is powered on by an external power source and the driver assembly remains in the power-off state, allowing the lighting system to reach a steady operational condition. In the steady operational condition, the driver assembly reaches a final temperature, and in at least one portion of the driver assembly, the difference between the initial temperature and the final temperature is less than at least one of 5° C., 7° C., or 10° C.

In one or more embodiments, the driver assembly is at a lower temperature than the LED assembly.

Other aspects and advantages of the present disclosure will become apparent from the following description, taken in conjunction with the accompanying drawings, illustrating by way of example, the principles of the present disclosure.

BRIEF DESCRIPTION OF DRAWINGS

Non-limiting and non-exhaustive embodiments of the disclosure are described with reference to the following figures, wherein reference numerals refer to like parts throughout the various views unless otherwise specified. The accompanying drawings constitute a part of the description and are used to provide a further understanding of the present disclosure. Such accompanying drawings illustrate the embodiments of the present disclosure used to describe the principles of the present disclosure. The embodiments are illustrated by way of example and not by way of limitation in the figures of the accompanying drawings in which references indicate similar elements. It should be noted that references to "an" or "one" embodiment in this disclosure are not necessarily to the same embodiment, and they mean at least one. In the drawings.

DETAILED DESCRIPTION

Figure 1A:
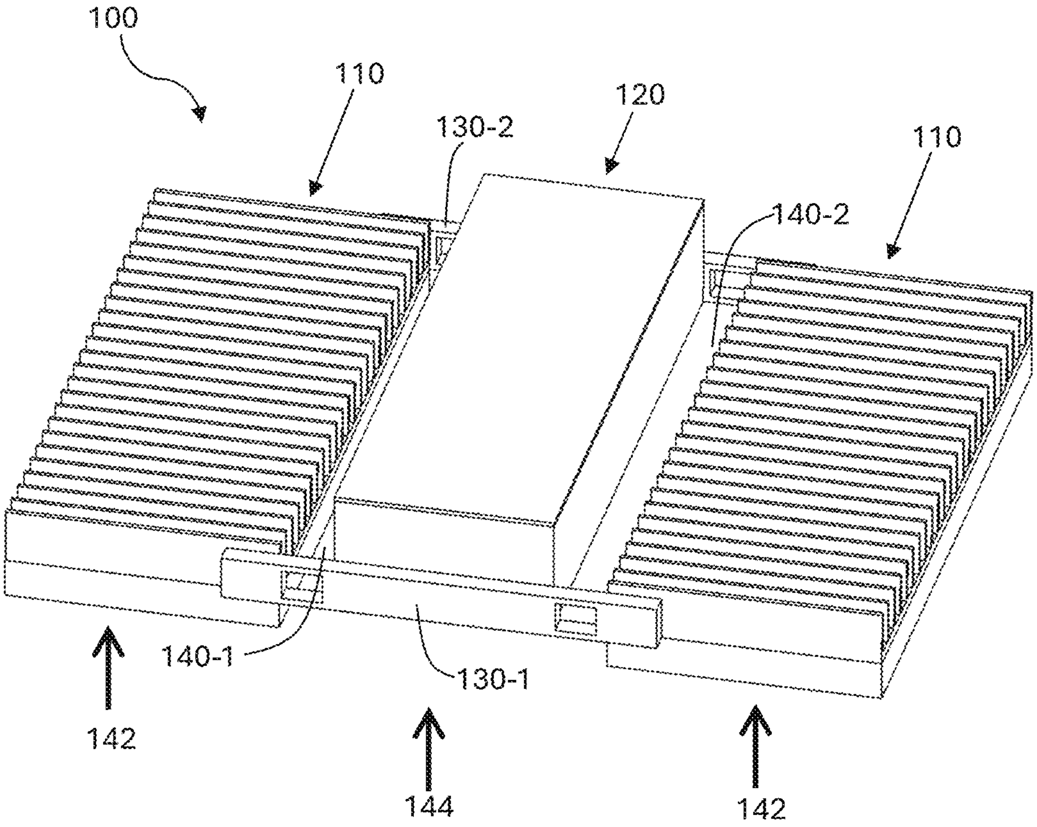
FIG. 1A and FIG. 1B illustrate perspective views of an example configuration of a lighting system, in accordance with an embodiment of the present disclosure.

The embodiments set forth below represent the necessary information to enable those skilled in the art to practice the embodiments and illustrate the best mode of practicing the embodiments. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" or "lateral" or "adjacent" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that the terms used herein should be interpreted as having a meaning that is consistent with their meaning in the context of this specification and the relevant art and will not be interpreted in an idealized or overly formal sense unless expressly so defined herein.

Unless otherwise expressly stated, comparative, quantitative terms such as "less than" and "greater than," are intended to encompass the concept of equality. As an example, "less" can mean not only "less" in the strictest mathematical sense, but also, "less than or equal to."

The terms "light emitter" or "solid state light emitter" or "solid state emitter" may correspond to a Light Emitting Diode (LED), or an organic LED.

In the context of the present disclosure, the term airflow can be used to refer to natural air convection in which the airflow typically takes place from a lower elevation and when heated, naturally rises to a higher elevation. The natural air convection therefore flows against the direction of gravity. However, the term airflow can alternatively include forced air convection such as from a fan. In such a case, the airflow can be in any direction.

The present disclosure relates to a lighting system, for example, an LED luminaire. In designing an efficient LED luminaire and to achieve an optimal performance of the LED luminaire, various factors such as durability, cost-effectiveness, and the like, need to be considered. For instance, a compact LED lighting system reduces material usage and manufacturing costs. Additionally, ensuring affordability of LED luminaire components is crucial for market competitiveness. However, achieving these goals while enhancing the lifespan and durability of the LED luminaire requires inventive ingenuity. This involves carefully selecting and integrating various configurations to manage heat dissipation, improve energy efficiency, and maintain structural integrity. Thus, while multiple configurations of LED luminaires can be adopted, the innovative application of the design choices is essential for creating the efficient LED luminaire.

The present disclosure offers a unique LED luminaire that effectively addresses the issues of the prior arts, and provides a solution that combines efficiency, affordability, and extended lifespan. Thus, an aspect of the present disclosure is to provide a lighting system with independent thermal management of the LED and driver components by mitigating thermal interaction between these components, thereby facilitating improved heat dissipation, reduced energy consumption, and extended operational lifespan of lighting systems.

Another aspect of the present disclosure is to provide an LED-based lighting system with improved efficiency, reliability, and performance of the lighting system.

Another aspect of the present disclosure is to facilitate enhanced thermal management of the lighting systems while ensuring a more compact and versatile design suitable for a wide range of applications.

Embodiments of the present disclosure will be described hereinafter with reference to FIG. 1A through FIG. 10C.

Figure 1B:
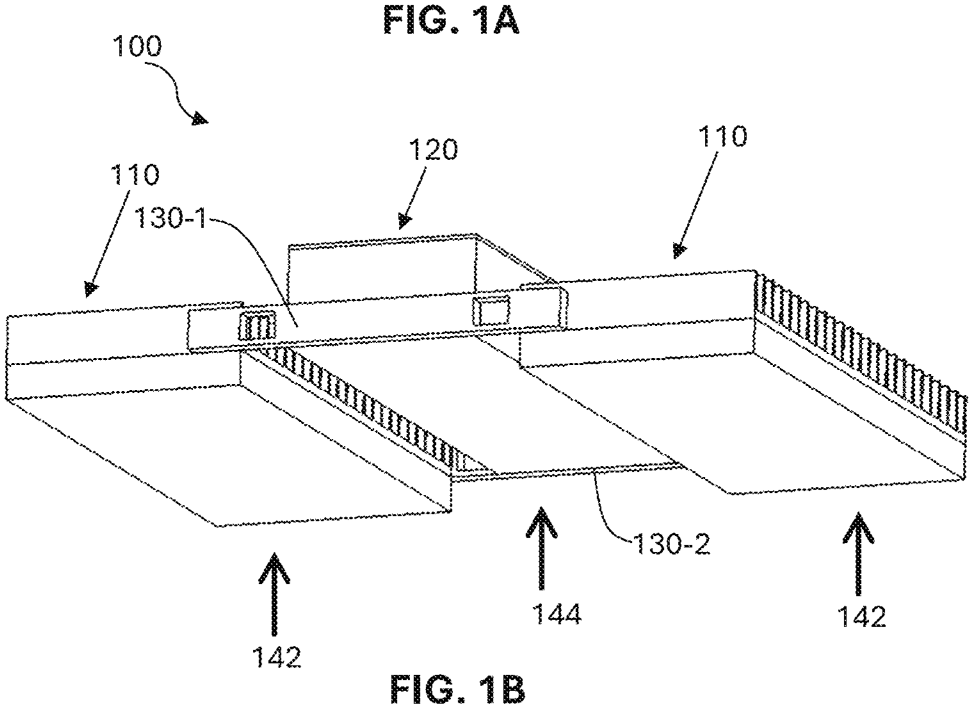

FIG. 1A and FIG. 1B illustrate perspective views of an example configuration of a lighting system 100, in accordance with an embodiment of the present disclosure. The lighting system 100 as shown in FIG. 1A illustrates a top perspective view, while in FIG. 1B, the lighting system 100 is viewed from a bottom/underside surface. In an implementation, the lighting system 100 may correspond to the LED luminaire.

The lighting system 100 includes a driver assembly 120, two LED assemblies 110 (hereinafter may also be collectively referred to as an LED assembly 110) arranged on opposite sides of the driver assembly 120, and two connecting members 130-1 and 130-2 (hereinafter may be collectively referred to as "connecting members 130" or a "connecting member 130") connecting each of the two LED assemblies 110 and the driver assembly 120. Although FIG. 1A through FIG. 1D (to be described later) depicts the two LED assemblies arranged on opposite sides of the driver assembly 120, alternatively, the lighting system may include a single LED assembly 110.

The LED assembly 110 may include a single LED or an array of LEDs (not shown in FIG. 1A, may be referred to as LEDs). The driver assembly 120 includes an electronic driver or driver (not shown in FIG. 1A) that powers the LEDs. Each of the LEDs and the driver generates heat in operating condition of the lighting system 100.

The connecting member 130 is adapted to mechanically connect the driver assembly 120 with each of the two LED assemblies 110. The connecting member 130 is further adapted to minimize thermal conduction between the LED assembly 110 and the driver assembly 120. In context of heat transfer mechanisms, thermal conduction refers to a transfer of heat energy through a solid material without movement of the material itself. The thermal conduction is influenced by factors such as bulk thermal conductivity of the material, geometrical characteristics including shape and size of the material, cross section area, contact resistance at interfaces between materials, temperature differences between the materials in contact, presence of defects or impurities, and the like.

In an implementation, the LED assembly 110 is designed to be exposed to a first airflow 142 (as indicated by arrow) for dissipating the heat from the LED assembly 110. The driver assembly 120 is designed to be exposed to a second airflow 144 (as indicated by arrow) for dissipating the heat from the driver assembly 120. In another implementation, the ambient air source for the second airflow 144 is substantially separated from a heated air from the first airflow 142 to minimize a thermal convection coupling of the first airflow 142 to the second airflow 144. In an implementation, the lighting system 100 further includes separations 140-1 and 140-2 between the LED assembly 110 and the driver assembly 120. The separations 140-1 and 140-2 may hereinafter be collectively referred to as "separations 140" or a "separation 140". The separation 140 ensures thermal convection isolation, preventing the heated air from the first airflow 142 from substantially mixing with the ambient air used for the second airflow 144. In an implementation, each of the two LED assemblies 110 may be separated from the driver assembly 120 by same distance i.e., the separations 140-1 and 140-2 are same dimensionally. In an alternative implementation, the separations 140-1 and 140-2 may be different dimensionally. In another implementation, the lighting system 100 may be designed in an arrangement so as to allow the heated air from the second airflow 144 to mix with the first airflow 142 i.e., a source for the first airflow 142 may not be pure ambient air, but may at least partially comprise heated exhaust air from the second airflow 144, which is at a higher temperature than the ambient air by at least 5° C., 10° C., or 15° C. In another implementation, the ambient air source for both the first airflow 142 and the second airflow 144 may be separated.

In another implementation, the separations 140-1 and 140-2 correspond to at least one of 90%, 80%, 70% or 60% of a total separation area between the LED assembly 110 and the driver assembly 120. The separations 140-1 and 140-2 may correspond to air gap/air space separations between the LED assembly 110 and the driver assembly 120.

Figure 1C:
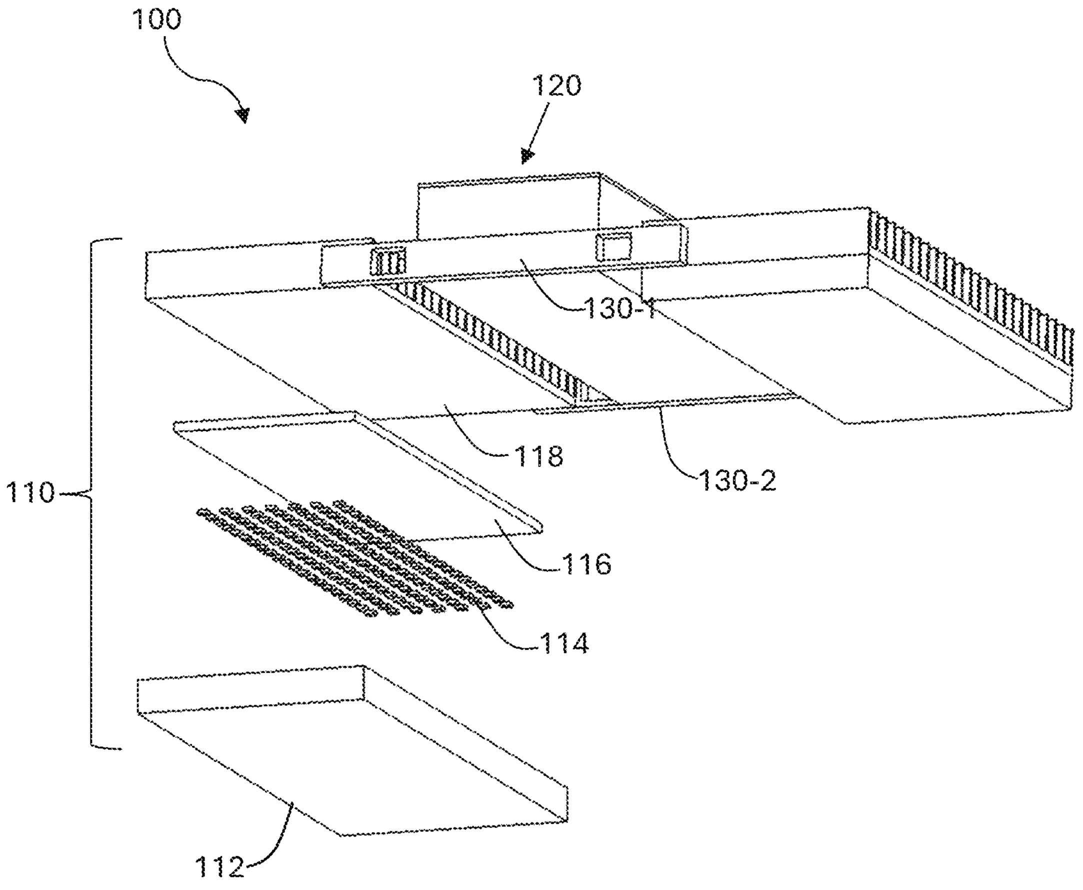
FIG. 1C illustrates a perspective view of the lighting system with an exploded view of a Light Emitting Diode (LED) assembly, in accordance with an embodiment of the present disclosure.

FIG. 1C illustrates a perspective view of the lighting system 100 with an exploded view of the LED assembly 110, in accordance with an embodiment of the present disclosure. The lighting system 100 includes the driver assembly 120, the two LED assemblies 110 arranged on opposite sides of the driver assembly 120, and the connecting members 130.

The LED assembly 110 may include an optic 112 (optional), an array of LEDs 114 (hereinafter may also be referred to as "LEDs 114" or an "LED 114"), a Printed Circuit Board (PCB) 116 thermally coupled to the LEDs 114, and a first heat sink 118. In some implementations, the optic 112 may simply serve the purpose of a window and does not substantially alter optical distribution of the light output from the LEDs 114, while in other cases, the optic 112 may diffuse the light or redirect the light or alter the optical distribution of the light output from the LEDs 114. The optic 112 refers to components such as lenses, prisms, mirrors, windows, diffusers and filters, which work together for modifying the distribution of light from a light source. The optic 112 is formed from any of transparent materials, translucent materials or optically transmissive materials such as glass or plastic materials such as Polycarbonate (PC) or Poly methyl methacrylate (PMMA or acrylic) to transmit a portion of a light output from the LEDs 114. The optic 112 may also comprise an array of lenses with each lens matched to an individual LED from within the array of LEDs.

The LEDs 114 refer to electrical components that emit light when electricity flows through it. The LEDs 114 generate heat during operation of the lighting system 100. The heat generated by the LEDs 114 is conducted to the PCB 116. The heat is then conducted to the first heat sink 118. The first airflow 142 is directed across the first heat sink 118 of the LED assembly 110. The heat conducted to the first heat sink 118 is dissipated by the first airflow 142.

In an example implementation of a 150 Watt (W) LED lighting system, 60.5 W heat is generated from the LEDs 114 of the LED assembly 110 and 8.66 W heat output is from the driver electronics. The remaining power of approximately 80 W is emitted as light that escapes the lighting system. As an example, to achieve 100,000 hours of life expectancy for the lighting system, the allowable temperature for the LEDs 114 is approximately 105° C. and 65° C. for the driver. Considering an ambient air temperature of $T_A$=50° C., a permissible rise in temperature i.e., dT (Delta in temperature) for 100,000 hours of the life expectancy of the lighting system is approximately 55° C. for the LEDs 114 and 15° C. for the driver. Thus, the temperature of the LEDs 114 can increase by approximately 55° C., but the temperature of the driver can only increase by 15° C. Hence, the driver is significantly more temperature sensitive (in this case, about 3.6 times (55/15)) than the LEDs 114.

In the context of the present disclosure, the term "temperature sensitive" refers to susceptibility of certain components to performance degradation, reduced lifespan, or failure when exposed to elevated temperatures or significant thermal fluctuations. The more temperature sensitive a component is, the less reliable the component becomes with higher temperature.

The failure of the driver is typically sudden, resulting in unacceptable light output such as very dim light from the LEDs, flashing on or off of the LEDs, and the like. Further, time until failure of the driver is highly temperature dependent. Typically, electrolytic capacitors are one of the most temperature sensitive component of the driver and maintaining lower temperatures within a driver enclosure is vital for longevity and reliability of the LED luminaires. For instance, if the temperature of the driver is reduced by 10° C., the life expectancy of the driver is doubled and for reduction in the temperature of the driver by 1° C., the life expectancy of the driver is increased by 1.07 times.

The PCB 116 includes a series of electrical circuits to power the LEDs 114. The PCB 116 is thermally coupled to the first heat sink 118. In an implementation, for improved thermal conduction, the PCB 116 may incorporate a metal core, a high-performance thermally conductive material, a ceramic-filled underlayment, a thermally conductive adhesive or composed of a Metal Core PCB (MCPCB).

The first heat sink 118 is adapted to dissipate the heat generated by the LEDs 114 during the operation of the lighting system 100. The first heat sink 118 is thermally coupled to the PCB 116, which in turn is connected to the LEDs 114, creating a heat transfer path for the LED assembly 110. In an implementation, the first heat sink 118 includes fins or ribbed extensions, designed to increase a surface area (for heat dissipation) significantly. The extended surface area facilitates greater contact of the first heat sink 118 with the first airflow 142, allowing for rapid convective heat transfer. In further embodiments, the first heat sink 118 may not include fin structures, but may simply include an extended surface that is in contact with the first airflow 142 to simplify a mechanical structure of the first heat sink 118 and the lighting system 100.

The driver assembly 120 includes the driver electronics or driver electronic module (not shown in FIG. 1C) that accepts power from an external source such as an Alternating Current (AC) main line voltage and converts the AC main line voltage to a suitable electrical voltage and current characteristics to power the LED assembly 110.

Figure 1D:
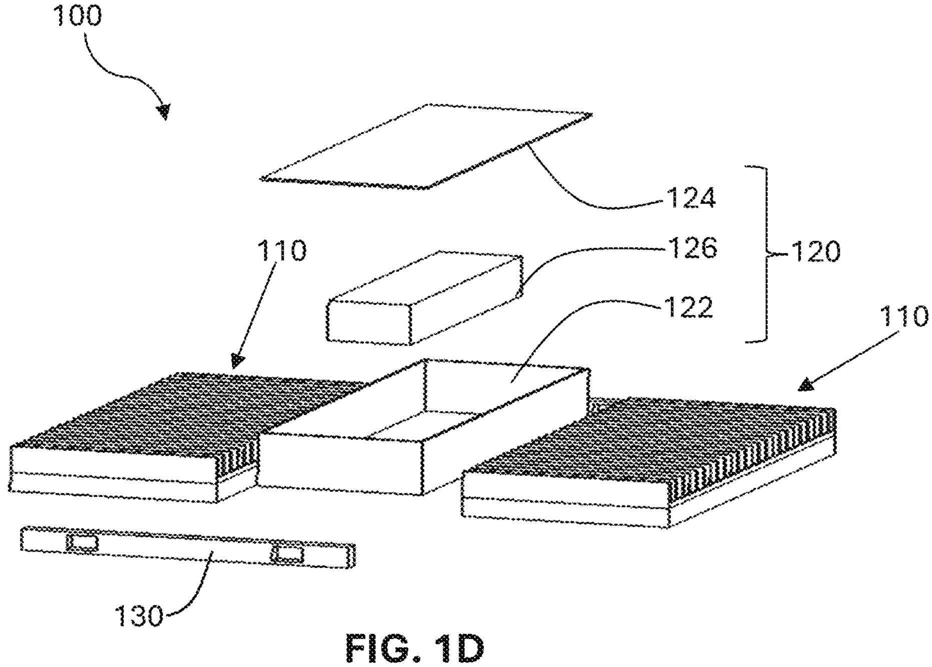
FIG. 1D illustrates a top perspective view of the lighting system with an exploded view of a driver assembly, in accordance with an embodiment of the present disclosure.

FIG. 1D illustrates a top perspective view of the lighting system 100 with an exploded view of the driver assembly 120, in accordance with an embodiment of the present disclosure. The lighting system 100 includes the driver assembly 120, the two LED assemblies 110 arranged on opposite sides of the driver assembly 120, and the connecting members 130 (connecting member 130-2 not visible in FIG. 1D).

The driver assembly 120 includes an enclosure 122, an enclosure lid 124 and an electronic driver 126 (hereinafter may also be referred to as a "driver 126"). The driver 126 is thermally coupled to the enclosure 122 or to the enclosure lid 124. The driver 126 is adapted to power the LEDs 114 through electrical leads (not shown in FIGs). The driver 126 powers the LEDs 114 by transforming an electrical input to an electrical output suitable for the LEDs 114. The driver 126 may include a driver box, a driver housing and electronic components such as PCBs, transistors, capacitors, resistors, transformers, integrated circuits, and inductors to power the LEDs 114. The driver 126 generates less heat than the LED but is more temperature-sensitive than the LED, particularly the electrolytic capacitors (not shown in FIGs) of the driver 126 are highly temperature sensitive.

The enclosure 122 serves as a primary housing for the driver 126. The enclosure 122 may protect the driver 126 from environmental factors like moisture, dust, and physical impacts, maintaining the lighting system's reliability in various operating conditions. The enclosure 122 may include provisions for securely mounting and thermally coupling the driver 126 inside, as well as external mounting features for integration within the lighting system 100. The heat generated from the driver 126 is conducted to the enclosure 122, and then thermally dissipated by the second airflow 144.

The enclosure lid 124 is designed to form a cover to the enclosure 122. In an implementation, the driver 126 may be thermally coupled to the enclosure 122 or to the enclosure lid 124. In an implementation, the enclosure 122 and/or the enclosure lid 124 may be formed of a thermally conductive material such as aluminium, aluminium alloy, steel, copper, or the like. In another implementation, the enclosure 122 and/or the enclosure lid 124 may itself function as a heat sink or may be thermally coupled to other heat sink components to dissipate the heat from the driver 126. In an implementation, the enclosure 122 and/or the enclosure lid 124 may be fabricated using sheet metal, die casting or other well-known fabrication techniques.

Figure 2A:
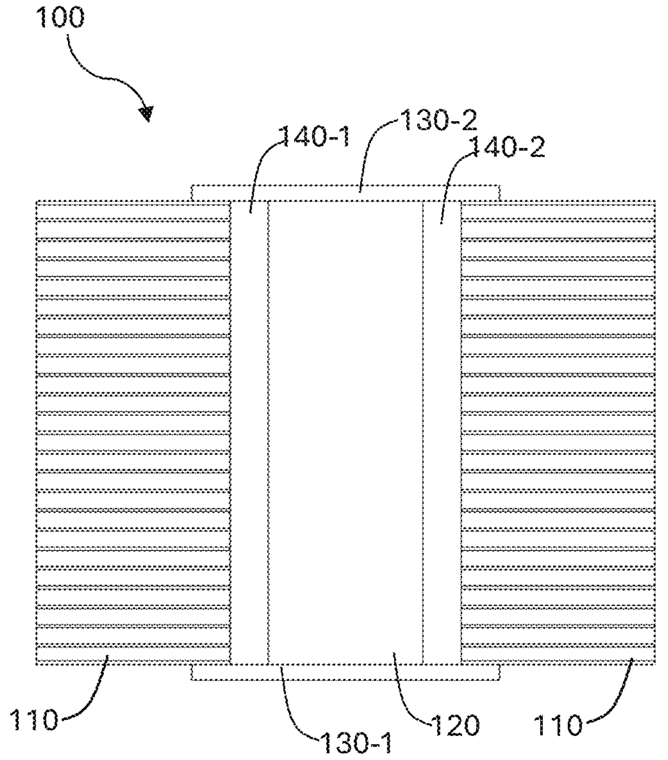
FIG. 2A illustrates a top view of the lighting system, in accordance with an embodiment of the present disclosure.
Figure 2B:
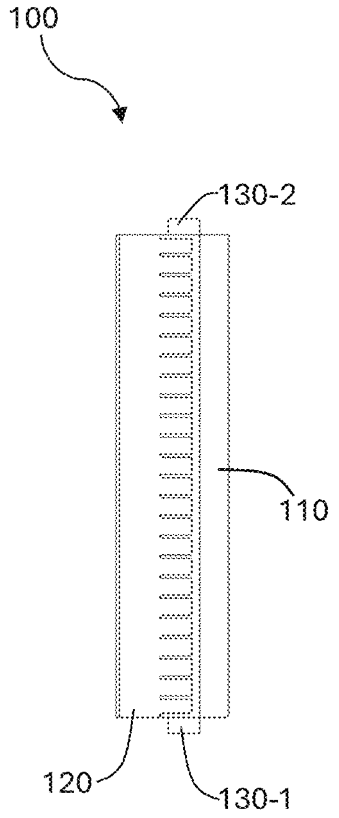
FIG. 2B illustrates a side view of the lighting system, in accordance with an embodiment of the present disclosure.
Figure 2C:
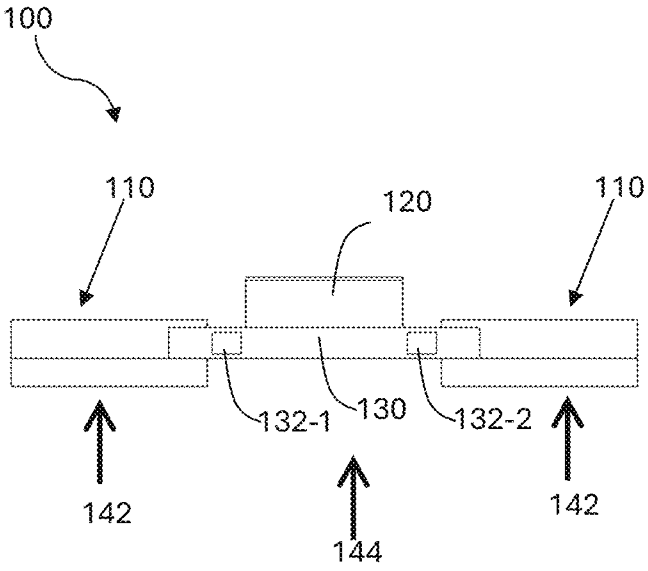
FIG. 2C illustrates a front view of the lighting system, in accordance with an embodiment of the present disclosure.

FIG. 2A illustrates a top view of the lighting system 100, in accordance with an embodiment of the present disclosure. FIG. 2B illustrates a side view of the lighting system 100, in accordance with an embodiment of the present disclosure. FIG. 2C illustrates a front view of the lighting system 100, in accordance with an embodiment of the present disclosure. Each of the FIGS. 2A through 2C illustrates two-dimensional (2D) views of the lighting system 100.

Referring to FIGS. 2A to 2C, the lighting system 100 includes the driver assembly 120, the two LED assemblies 110 (collectively referred to as the "LED assembly 110") arranged on opposite sides of the driver assembly 120, and the connecting member 130 (shown as the two connecting members 130-1 and 130-2 in FIG. 2A and FIG. 2B) connecting each of the two LED assemblies 110 and the driver assembly 120.

In an implementation, the connecting members 130-1 and 130-2 may include hollow portions, which may be of same or different sizes. The purpose of providing the hollow portions in the connecting member is to ensure reduction in cross-sectional area of the connecting member 130 and thereby reduce thermal conduction. In another implementation, at least a portion of the connecting member 130 may include a constricted cross-sectional portion to reduce the thermal conduction. The effect of providing the hollow portions or the constricted portion in the connecting member 130 is that the material continuity and thereby thermal conductivity of the connecting member 130 is disrupted, effectively creating thermal barriers and thereby decreasing the effective thermal conduction of the connecting member 130. Further, the heat generated by the LEDs is confined to the immediate vicinity of the LEDs rather than being conducted to the driver, which could have otherwise led to overheating of sensitive electronic components of the driver. In an implementation as shown in FIG. 2C, the connecting member 130 includes a first slot 132-1 and a second slot 132-2.

Figure 3A:
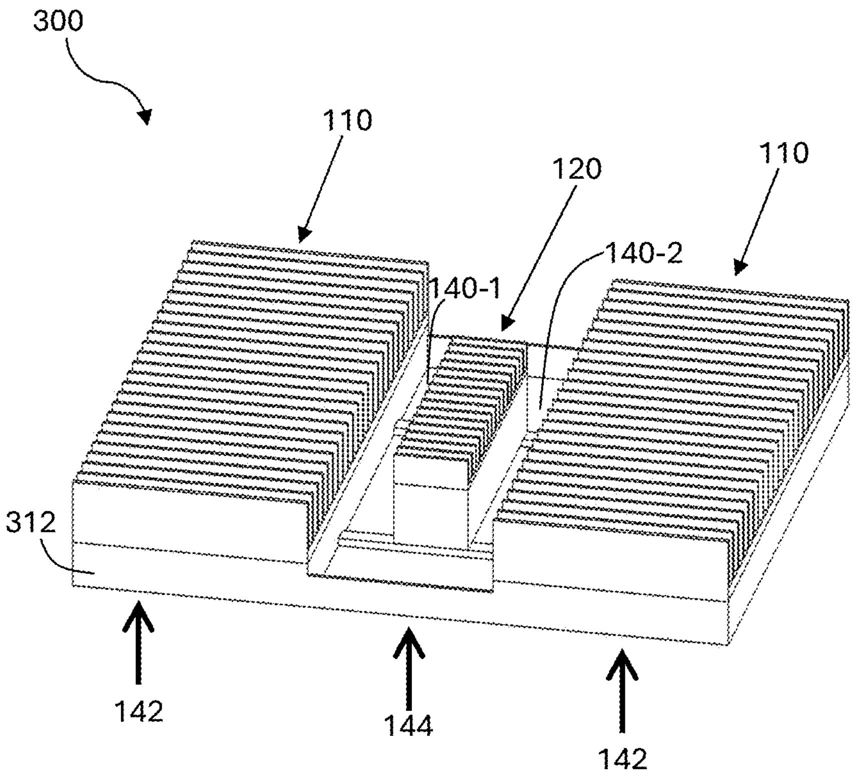
FIG. 3A and FIG. 3B illustrate perspective views of another example configuration of a lighting system, in accordance with an embodiment of the present disclosure.
Figure 3B:
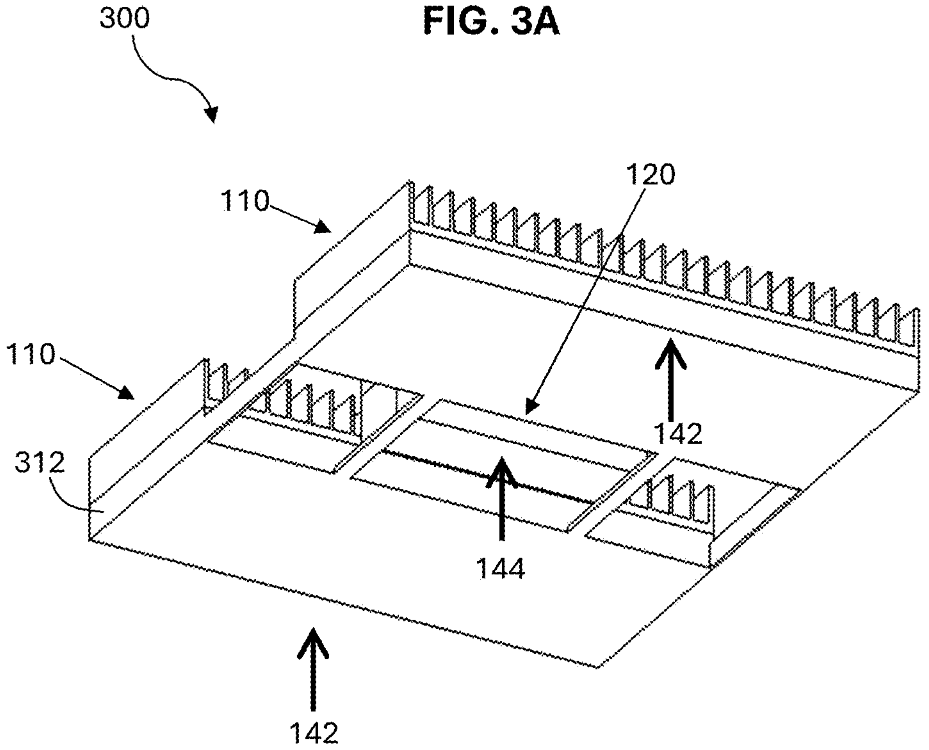

FIG. 3A and FIG. 3B illustrate perspective views of another example configuration of a lighting system 300, in accordance with an embodiment of the present disclosure. The lighting system 300 as shown in FIG. 3A illustrates a top perspective view while in FIG. 3B, the lighting system 300 is viewed from a bottom/underside surface.

The lighting system 300 includes the driver assembly 120 and the two LED assemblies 110 (collectively referred to as the LED assembly 110) arranged on opposite sides of the driver assembly 120. Although FIG. 3A through FIG. 3C (to be described later) depicts the two LED assemblies 110 arranged on opposite sides of the driver assembly 120, alternatively, there may be only a single LED assembly 110 adjacent to the driver assembly 120.

The lighting system 300 further includes an optic 312 extending to a bottom surface of the LED assembly 110 and the driver assembly 120. The optic 312 in FIG. 3A through FIG. 3F also acts as a support structure for the enclosure 122 of the driver assembly 120. The optic 312 is integrated with the connecting member and adapted to minimize the thermal conduction between the LED assembly 110 and the driver assembly 120. The optic 312 includes additional features of the connecting member and the driver support structure as depicted in FIG. 3A through FIG. 3F, which is different from the optic 112 depicted in FIG. 1C.

In an implementation, the LED assembly 110 is designed to be exposed to the first airflow 142 (as indicated by arrow) for dissipating the heat from the LED assembly 110. The driver assembly 120 is designed to be exposed to the second airflow 144 (as indicated by arrow) for dissipating the heat from the driver assembly 120. In a further implementation, the LED assembly 110 and the driver assembly 120 are physically separated forming a separation area having a first portion, i.e., the connecting member 130 connecting the LED assembly 110 and the driver assembly 120 and a second portion comprising of separations 140-1 and 140-2 (shown in FIG. 3A) between the LED assembly 110 and the driver assembly 120.

Figure 3C:
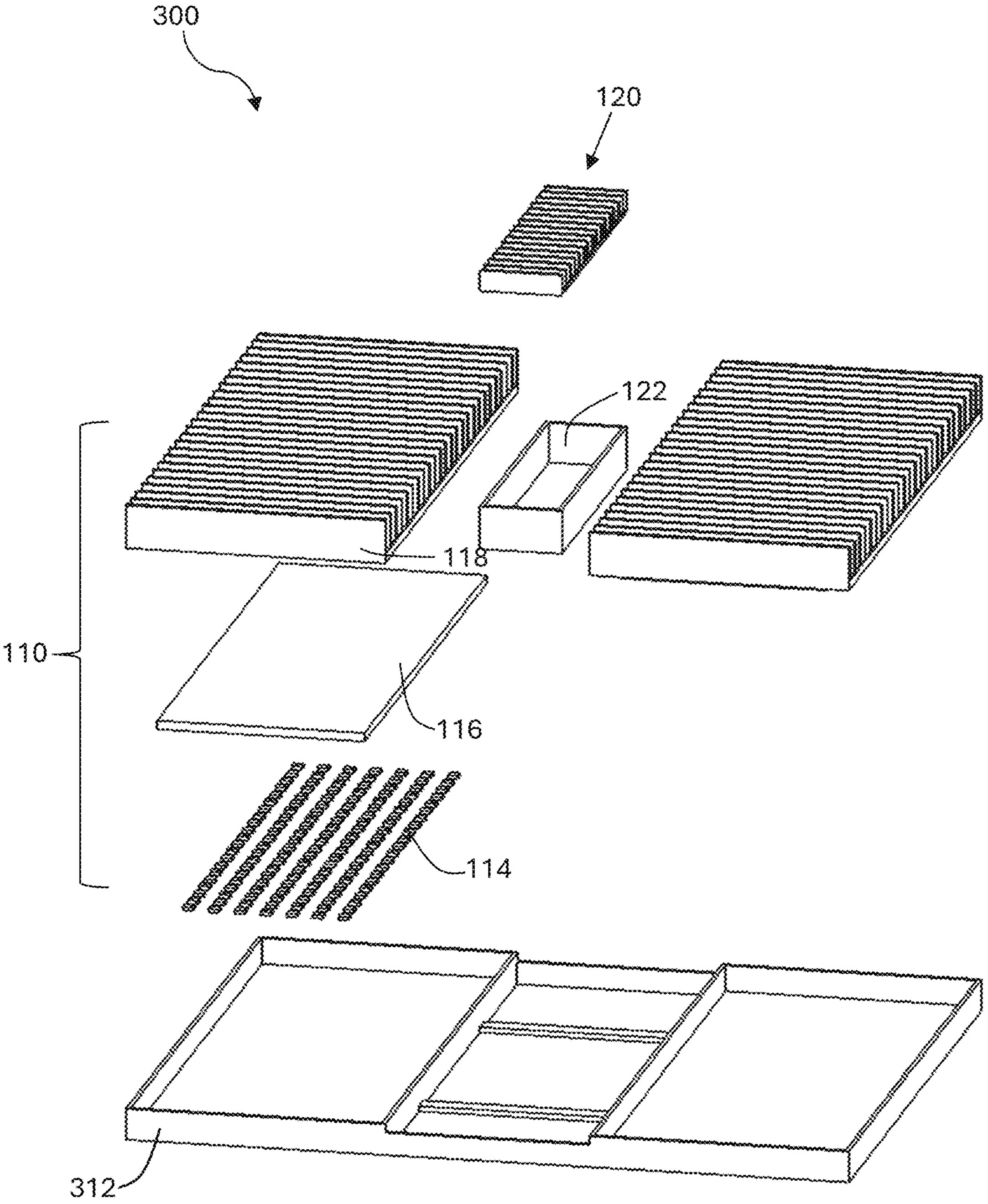
FIG. 3C illustrates a perspective view of the lighting system with an exploded view of the LED assembly, in accordance with an embodiment of the present disclosure.

FIG. 3C illustrates a perspective view of the lighting system 300 with an exploded view of the LED assembly 110, in accordance with an embodiment of the present disclosure. The lighting system 300 includes the driver assembly 120, the two LED assemblies 110 (collectively referred to as the LED assembly 110) arranged on opposite sides of the driver assembly 120, and the optic 312 extending through the bottom surface of the LED assembly 110 and the driver assembly 120.

The LED assembly 110 includes the optic 312, the LEDs 114, the PCB 116 thermally coupled to the LEDs 114, and the first heat sink 118. The driver assembly 120 includes the driver (not shown in FIG. 3C) that powers the LEDs 114, and the enclosure 122. The enclosure 122 of the driver assembly 120 is supported by the optic 312 integrated with the connecting member.

Figure 3D:
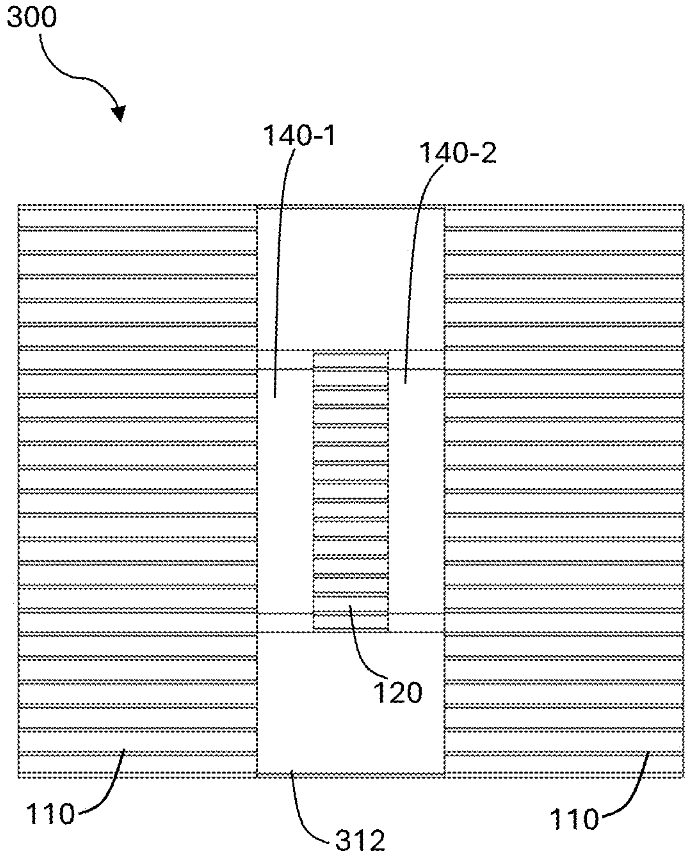
FIG. 3D illustrates a top view of the lighting system, in accordance with an embodiment of the present disclosure.
Figure 3E:
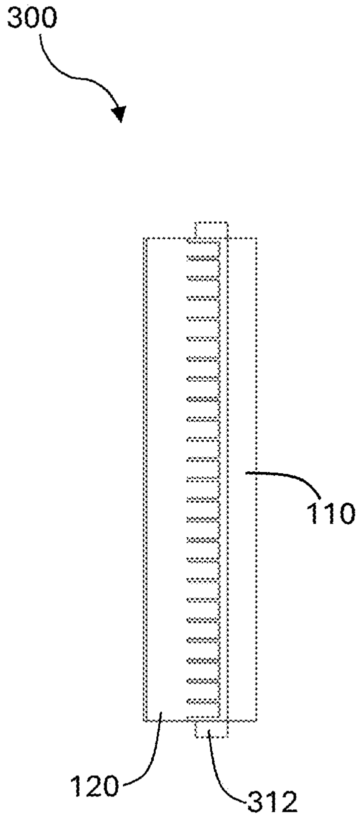
FIG. 3E illustrates a side view of the lighting system, in accordance with an embodiment of the present disclosure.
Figure 3F:
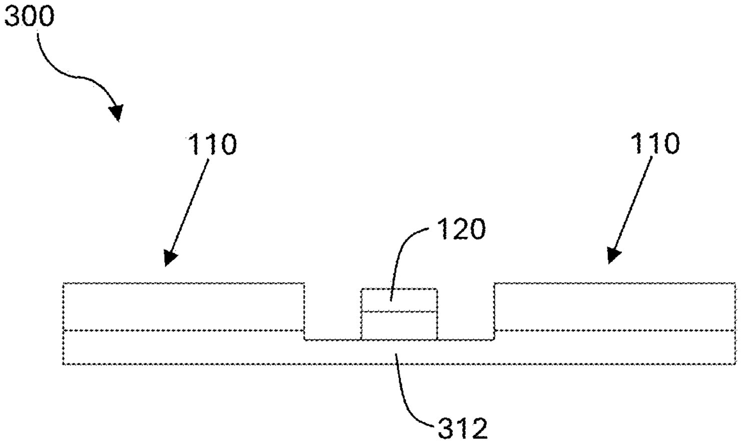
FIG. 3F illustrates a front view of the lighting system, in accordance with an embodiment of the present disclosure.

FIG. 3D illustrates a top view of the lighting system 300, in accordance with an embodiment of the present disclosure. FIG. 3E illustrates a side view of the lighting system 300, in accordance with an embodiment of the present disclosure. FIG. 3F illustrates a front view of the lighting system 300, in accordance with an embodiment of the present disclosure. Each of the FIGS. 3D through 3F illustrates 2D views of the lighting system 300.

Referring to FIGS. 3D to 3F, the lighting system 300 includes the driver assembly 120, the two LED assemblies 110 (collectively referred to as the LED assembly 110) arranged on opposite sides of the driver assembly 120, the optic 312 extending throughout the bottom surface of the LED assembly 110 and the driver assembly 120, and the separations 140-1 and 140-2 between the LED assembly 110 and the driver assembly 120.

Figure 4A:
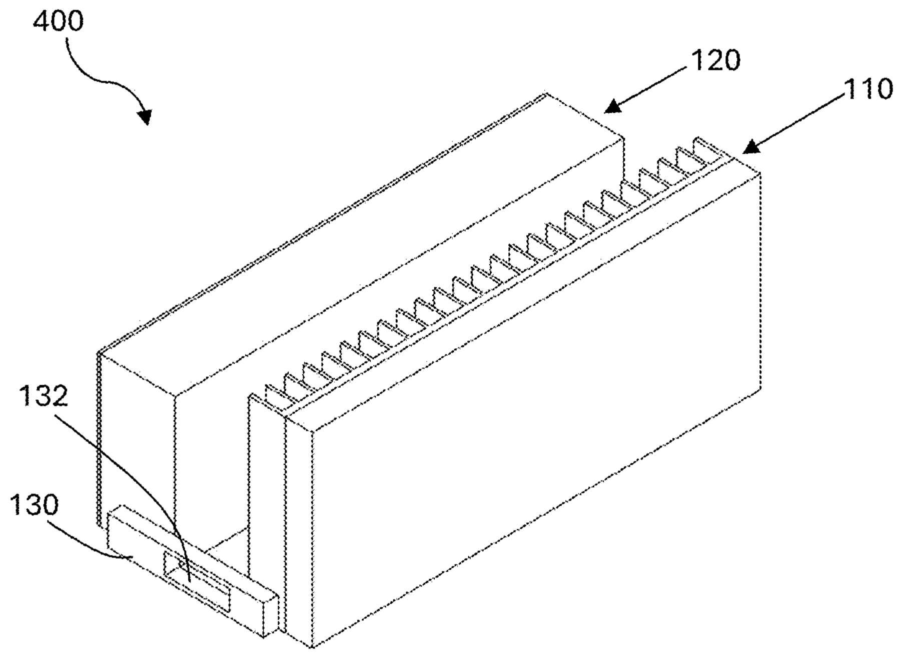
FIG. 4A illustrates a perspective view of another example configuration of a lighting system, in accordance with an embodiment of the present disclosure.

FIG. 4A illustrates a perspective view of another example configuration of a lighting system 400, in accordance with an embodiment of the present disclosure. The lighting system 400 includes a single LED assembly 110 and the driver assembly 120 connected by the connecting member 130. In an implementation and as shown in FIGS. 4A through 4E, the connecting member 130 may correspond to a rectangular bar provided with one or more slots 132. The result of providing the one or more slots 132 on the rectangular bar is constricting the flow of thermal energy by reducing the cross-sectional area, thereby decreasing the effective thermal conduction of the connecting member 130.

Figure 4B:
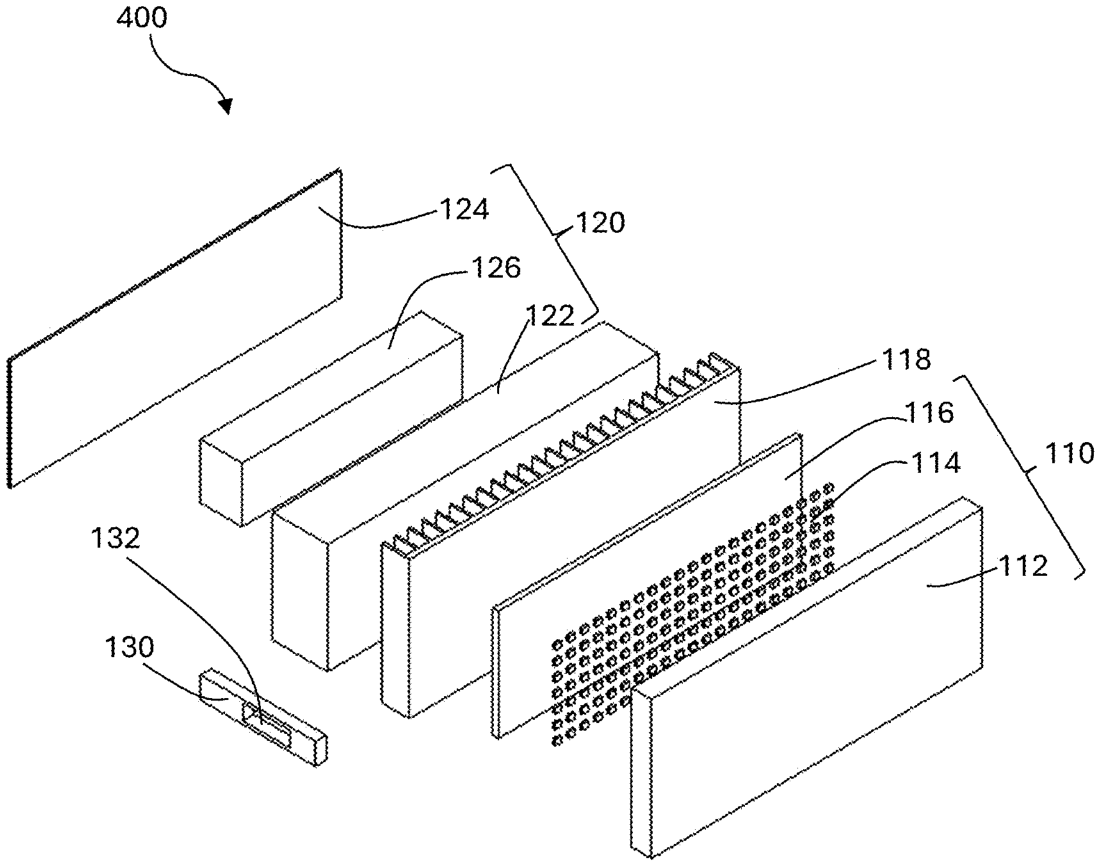
FIG. 4B illustrates an exploded perspective view of the lighting system, in accordance with an embodiment of the present disclosure.

FIG. 4B illustrates an exploded perspective view of the lighting system 400, in accordance with an embodiment of the present disclosure. The lighting system 400 includes the LED assembly 110 and the driver assembly 120 connected by the connecting member 130 including the one or more slots 132. The LED assembly 110 includes the optic 112, the LEDs 114, the PCB 116 and the first heat sink 118. The driver assembly 120 includes the enclosure 122, the enclosure lid 124 and the driver 126.

Figure 4C:
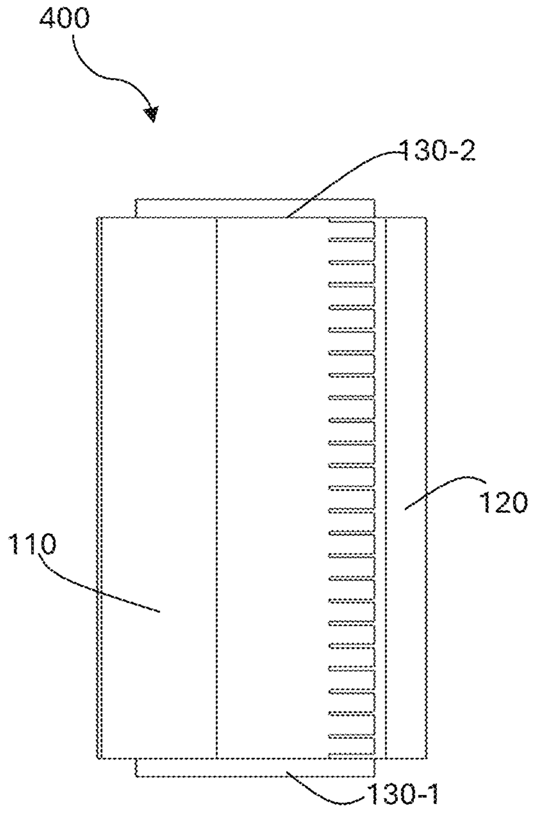
FIG. 4C illustrates a top view of the lighting system, in accordance with an embodiment of the present disclosure.
Figure 4D:
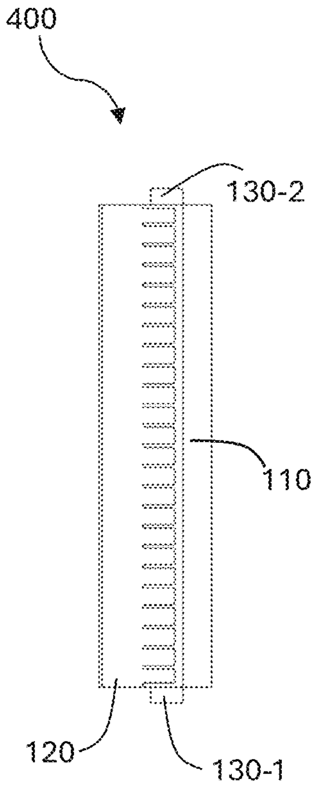
FIG. 4D illustrates a side view of the lighting system, in accordance with an embodiment of the present disclosure.
Figure 4E:
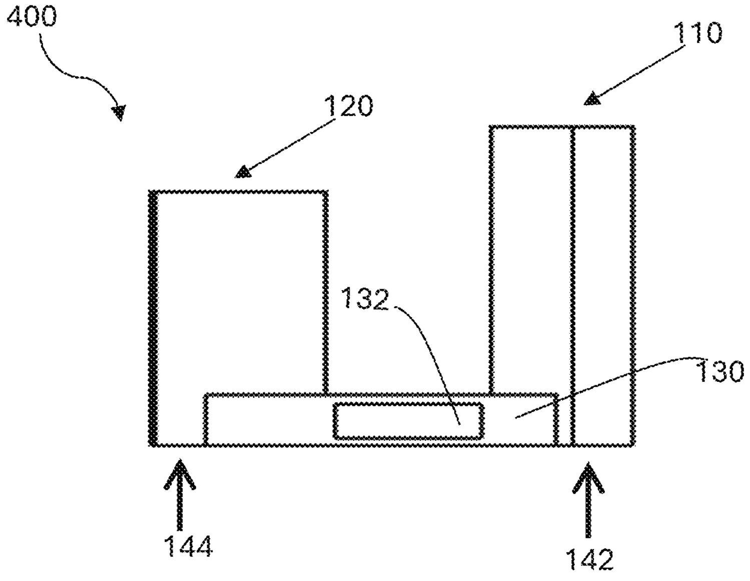
FIG. 4E illustrates a front view of the lighting system, in accordance with an embodiment of the present disclosure.

FIG. 4C illustrates a top view of the lighting system 400, in accordance with an embodiment of the present disclosure. FIG. 4D illustrates a side view of the lighting system 400, in accordance with an embodiment of the present disclosure. FIG. 4E illustrates a front view of the lighting system 400, in accordance with an embodiment of the present disclosure. Each of the FIGS. 4C through 4E illustrates 2D views of the lighting system 400. The lighting system 400 includes the single LED assembly 110, the driver assembly 120, and the connecting member 130 with the one or more slots 132.

Referring to FIG. 4E, the driver assembly 120 is exposed to the second airflow 144 and the LED assembly 110 is exposed to the first airflow 142. The ambient air source for the second airflow 144 is substantially separated from the heated air from the first airflow 142 while the heated air from the second airflow 144 may mix with the first airflow 142. This arrangement ensures that the temperature of the driver is not affected by the rise in the temperature of the LED assembly 110.

Figure 5A:
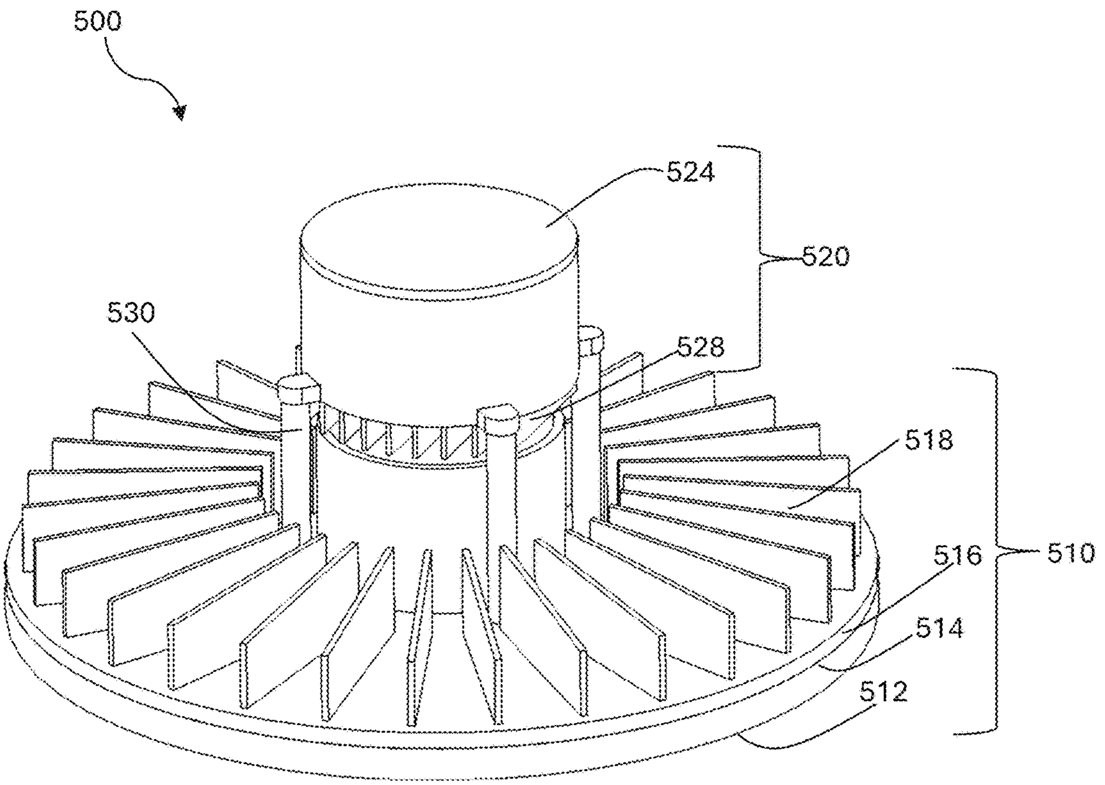
FIG. 5A illustrates a perspective view of a lighting system, in accordance with an embodiment of the present disclosure.
Figure 5B:
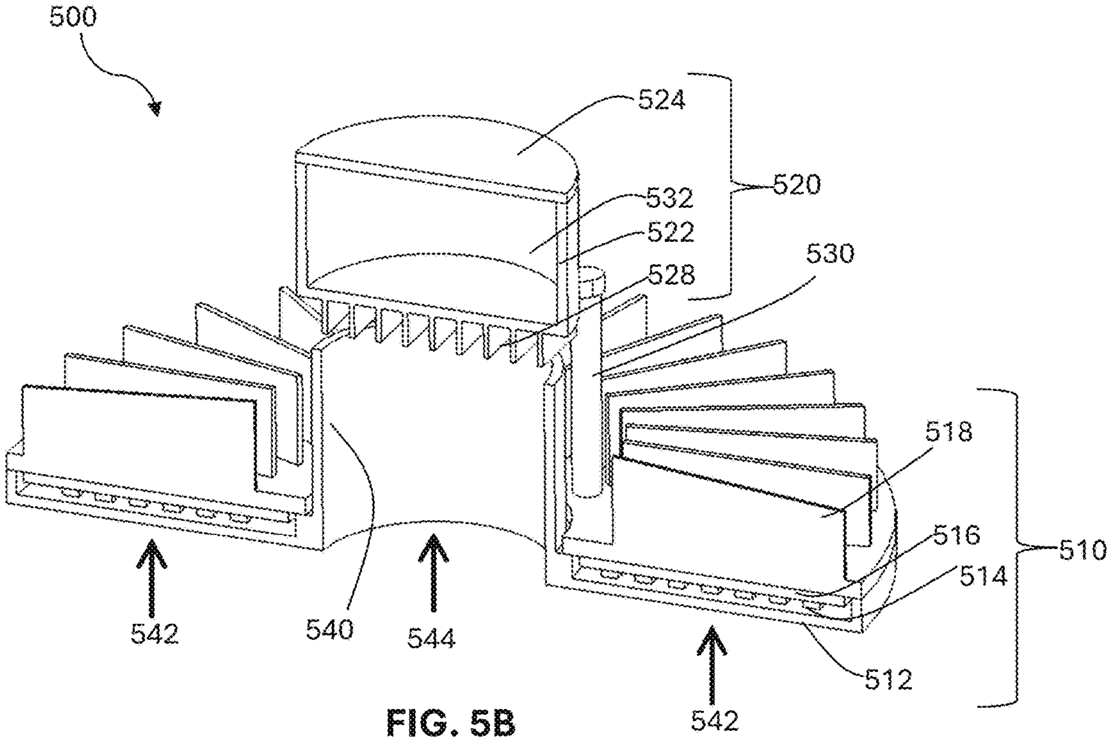
FIG. 5B illustrates a perspective view of the lighting system across a cut section along a vertical plane, in accordance with an embodiment of the present disclosure.
Figure 5C:
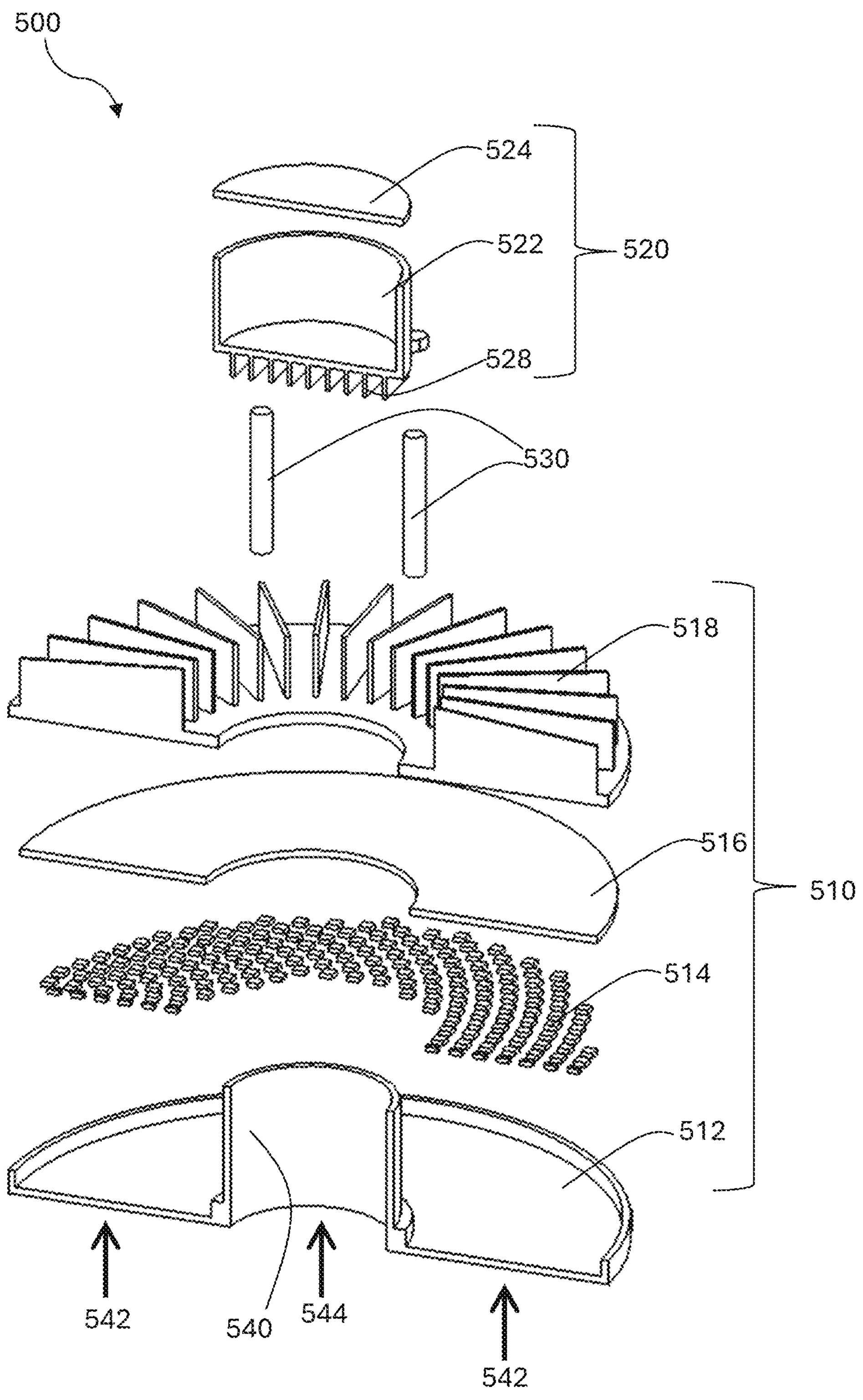
FIG. 5C illustrates an exploded perspective cross-sectional view of the lighting system as shown in FIG. 5B, in accordance with an embodiment of the present disclosure.

FIG. 5A illustrates a perspective view of a lighting system 500, in accordance with an embodiment of the present disclosure. FIG. 5B illustrates a perspective view of the lighting system 500 across a cut section along a vertical plane, in accordance with an embodiment of the present disclosure. FIG. 5C illustrates an exploded perspective cross-sectional view of the lighting system 500 as shown in FIG. 5B, in accordance with an embodiment of the present disclosure.

Referring to FIGS. 5A through 5C, the lighting system 500 includes a driver assembly 520, an LED assembly 510 at least partially surrounding the driver assembly 520, and connecting members 530. The LED assembly 510 includes an optic 512, an array of LEDs 514 (hereinafter may also be referred to as "LEDs 514"), a PCB 516 thermally coupled to the LEDs 514, and a first heat sink 518.

The first heat sink 518 incorporates a plurality of radial fins, extending outwards from a central axis of the lighting system 500. This arrangement increases the surface area for heat dissipation, enhancing the effectiveness of natural or forced convection cooling.

The driver assembly 520 includes an enclosure 522, an enclosure lid 524, an electronic driver (not shown) located in a space 532 within the enclosure 522, and a second heat sink 528 with heat dissipation features such as fins. In an implementation as shown in FIGS. 5A through 5C, the LED assembly 510 is shaped in a circular arrangement and the driver assembly 520 is centrally located with respect to the circular arrangement. The enclosure 522 of the driver assembly 520 is formed as a hollow cylindrical portion designed to accommodate the driver. In another implementation, the LED assembly 510 may be in a rectangular, square or any other geometrical configuration, and the driver assembly 520 may be centrally located or located on the edge or in any other arrangement above the LED assembly 510. Further, the enclosure 522 may be designed as a circular or any other geometrical cross-section structure.

The second heat sink 528 is adapted to dissipate the heat from the driver assembly 520. The enclosure 522 is located centrally in the lighting system 500, providing a protective housing for driver electronics. The enclosure 522 is designed to shield the driver assembly 520 from external environmental factors such as dust, moisture, and temperature fluctuations. In alternative embodiment, the driver assembly 520 may be located on the edge of the LED assembly 510.

The second heat sink 528 is integrated with the enclosure 522, ensuring that the heat generated by the driver is efficiently transferred to the second heat sink 528. A second airflow 544 is directed across the second heat sink 528 of the driver assembly 520. The heat transferred from the driver to the second heat sink 528 is dissipated into the surrounding environment. In an implementation, the second heat sink 528 is positioned substantially above the first heat sink 518. The second airflow 544 is substantially isolated in convection from the first airflow 542.

The connecting member 530 mechanically couples but thermally isolates in thermal conduction the driver assembly 520 to the LED assembly 510. In one embodiment, the first airflow 542 (similar to the first airflow 142) is incident on the LED assembly 510 and the second airflow 544 is incident on the driver assembly 520, without being substantially heated by the LED assembly 510.

The connecting members 530 are positioned between the LED assembly 510 and the driver assembly 520. Referring to FIGS. 5A through 5C, the connecting members 530 correspond to a plurality of vertical members arranged circumferentially around and below the enclosure 522 of the driver assembly 520. The connecting members 530 are designed to provide structural spacing between the driver assembly 520 and the first heat sink 518, ensuring structural stability while minimizing direct thermal conduction between the driver assembly 520 and the LED assembly 510.

In a further implementation and as shown in FIGS. 5B and 5C, the lighting system 500 includes a thermal convection isolation barrier 540 (hereinafter may also be interchangeably referred to as a "thermal isolation barrier 540" or an "isolation barrier 540") that prevents the second airflow 544 from being heated by the LED assembly 510. In an implementation, the thermal isolation barrier 540 is formed of a thermally insulating material, for instance, plastic. In a further implementation, the thermal isolation barrier 540 may form a part of the optic 512. In a further embodiment, the thermal convection isolation barrier 540 substantially prevents convection airflow from the LED assembly 510 to mix with the second airflow 544. Thus, the second air flow 544 source is substantially from the ambient air and not substantially intermingled with the first airflow 542 that is heated by the LED assembly 510.

Figure 6A:
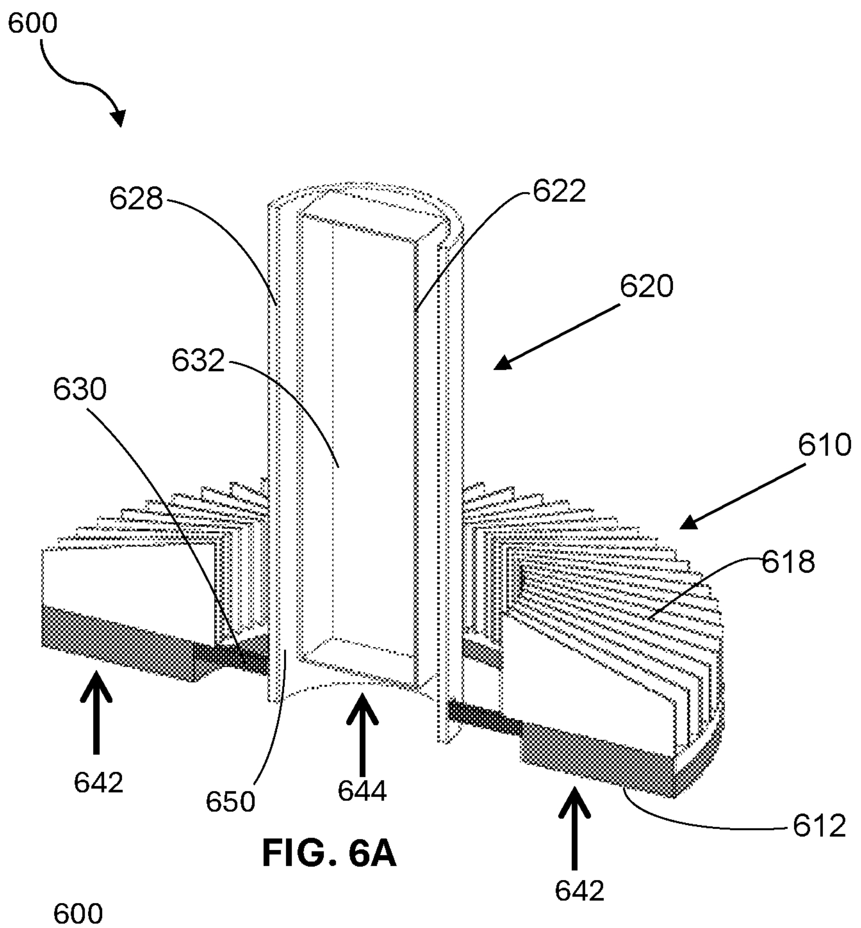
FIG. 6A illustrates a perspective view of another example configuration of a lighting system across a cut-section along the vertical plane, in accordance with an embodiment of the present disclosure.
Figure 6B:
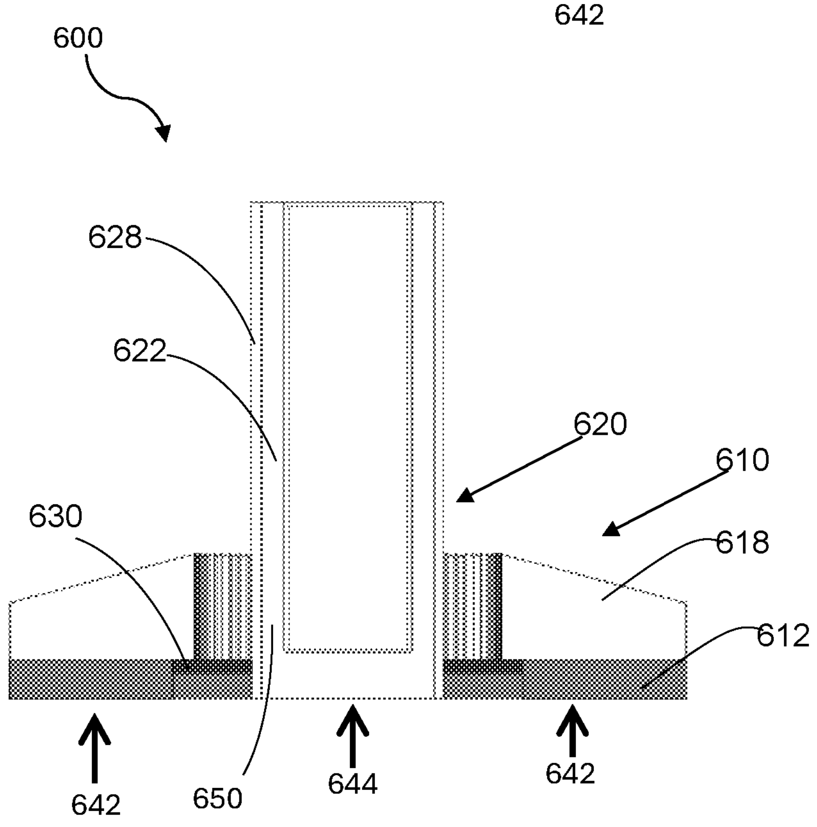
FIG. 6B illustrates a 2D view of the lighting system as shown in FIG. 6A, in accordance with an embodiment of the present disclosure.
Figure 6C:
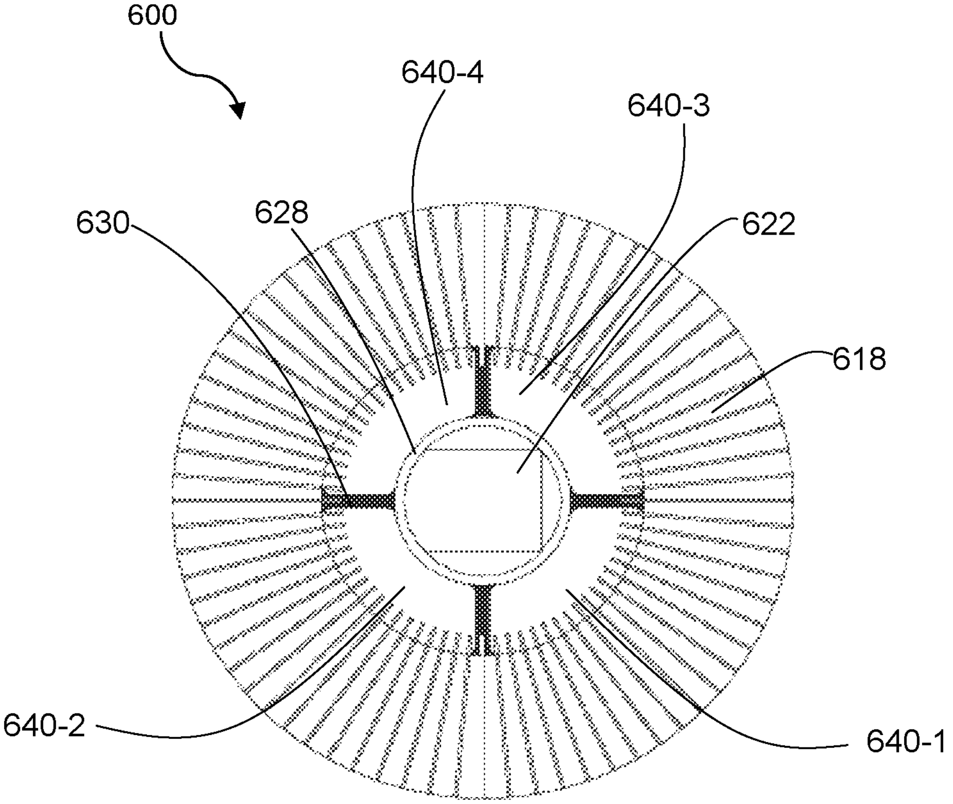
FIG. 6C illustrates a top view of the lighting system as shown in FIG. 6A, in accordance with an embodiment of the present disclosure.

FIG. 6A illustrates a perspective view of another example configuration of a lighting system 600 across a cut section along a vertical plane, in accordance with an embodiment of the present disclosure. FIG. 6B illustrates a 2D view of the lighting system 600 as shown in FIG. 6A, in accordance with an embodiment of the present disclosure. FIG. 6C illustrates a top view of the lighting system 600 as shown in FIG. 6A, in accordance with an embodiment of the present disclosure.

The lighting system 600 includes an LED assembly 610, a driver assembly 620 and connecting members 630. The LED assembly 610 includes an optic 612, the array of LEDs or the LEDs (not shown in FIGS. 6A to 6C), a PCB (not shown) thermally coupled to the LEDs, and a first heat sink 618.

The driver assembly 620 includes an enclosure 622, an electronic driver (not shown) located in a space 632 within the enclosure 622, and a second heat sink 628 in the form of cylinder surrounding and thermally connected to the driver assembly 620. The front of the driver assembly 620 is positioned at the same level as the LED assembly 610. The second heat sink 628 is placed surrounding the enclosure 622.

A first airflow 642 (similar to the first airflow 142) passes through the LED assembly 610. A second airflow 644 passes in an air gap opening 650 between the second heat sink 628 and the driver assembly 620. Another portion of the second airflow 644 passes on the outside of the second heat sink 628. In this arrangement, the source of the second airflow 644 is from the ambient air without being substantially heated by the LED assembly 610.

The connecting members 630 are positioned between the LED assembly 610 and the driver assembly 620. Referring to FIGS. 6A through 6C, the connecting members 630 correspond to a plurality of horizontals members arranged circumferentially around the enclosure 622 of the driver assembly 620. The connecting members 630 provide structural spacing or air gaps 640-1, 640-2, 640-3 and 640-4 between the driver assembly 620 and the first heat sink 618. The connecting member 630 and the optic 612 may be formed of different materials. In an implementation, the connecting member 630 is formed of a lower bulk thermal conductivity material such as a plastic material. The connecting member 630 is formed of sufficient length to isolate and substantially separate the first airflow 642 from the second airflow 644.

Figure 6D:
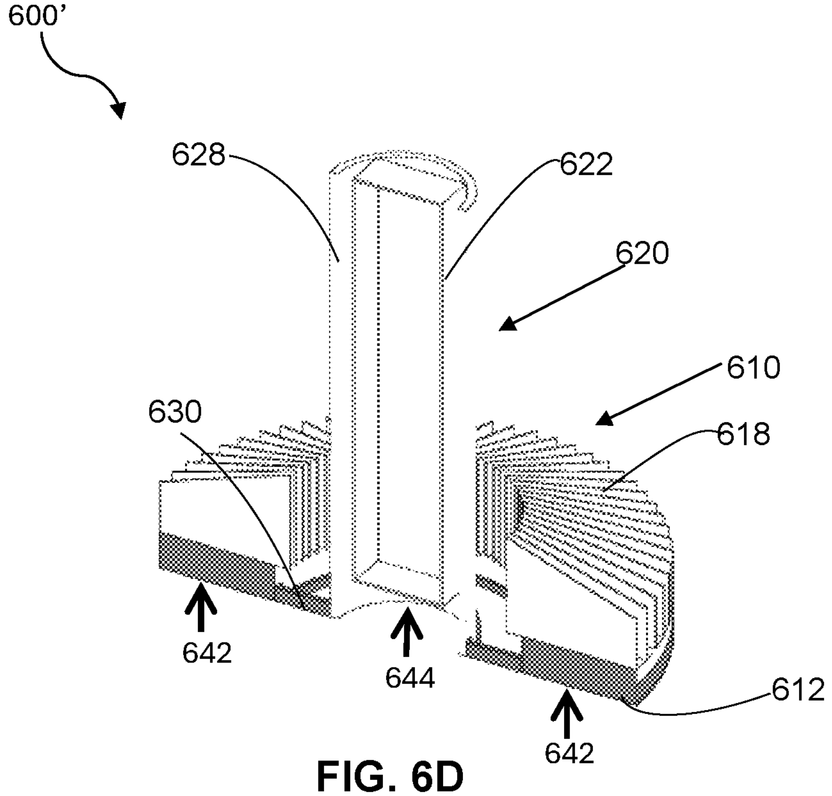
FIG. 6D illustrates a perspective view of another example configuration of a lighting system across a cut section along a vertical plane, in accordance with an embodiment of the present disclosure.
Figure 6E:
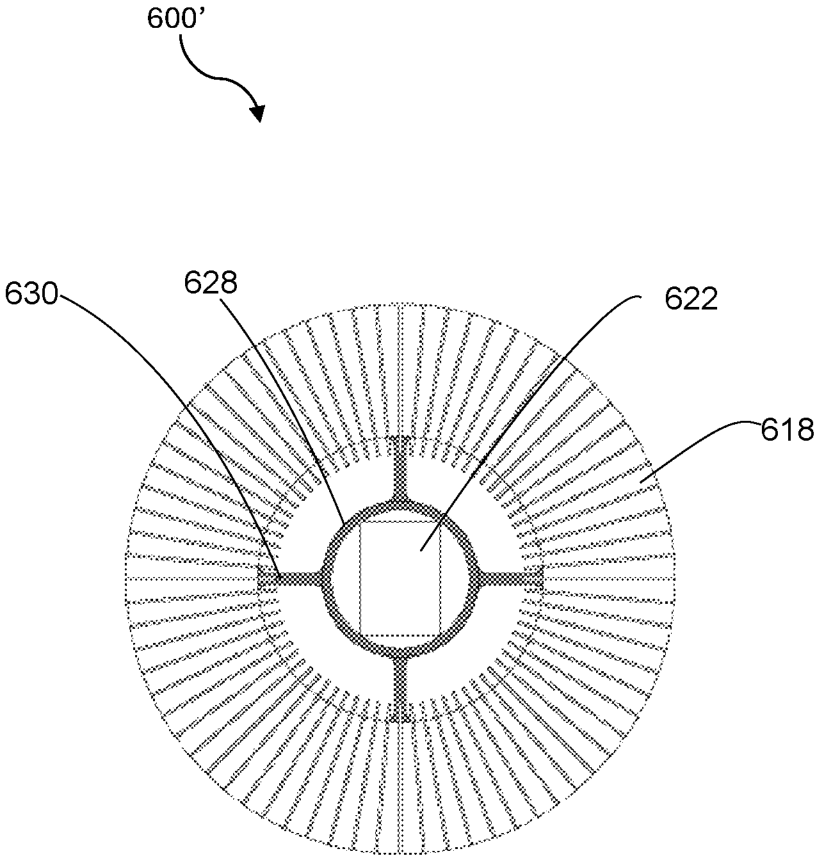
FIG. 6E illustrates a top view of the lighting system as shown in FIG. 6D, in accordance with an embodiment of the present disclosure.

FIG. 6D illustrates a perspective view of another example configuration of a lighting system 600' across a cut section along a vertical plane, in accordance with an embodiment of the present disclosure. FIG. 6E illustrates a top view of the lighting system 600' as shown in FIG. 6D, in accordance with an embodiment of the present disclosure.

The lighting system 600' as shown in FIGS. 6D and 6E are similar to that in FIGS. 6A and 6C respectively, except that the connecting member as shown in FIGS. 6D and 6E are formed of the same material as the optic 612. Thus, a detailed description of the FIGS. 6D and 6E are not incorporated herein for the sake of brevity. The optic 612 and the connecting member 630 are formed of the low bulk thermal conductivity material such as plastic material that is optically transmissive (or translucent or transparent).

Figure 7A:
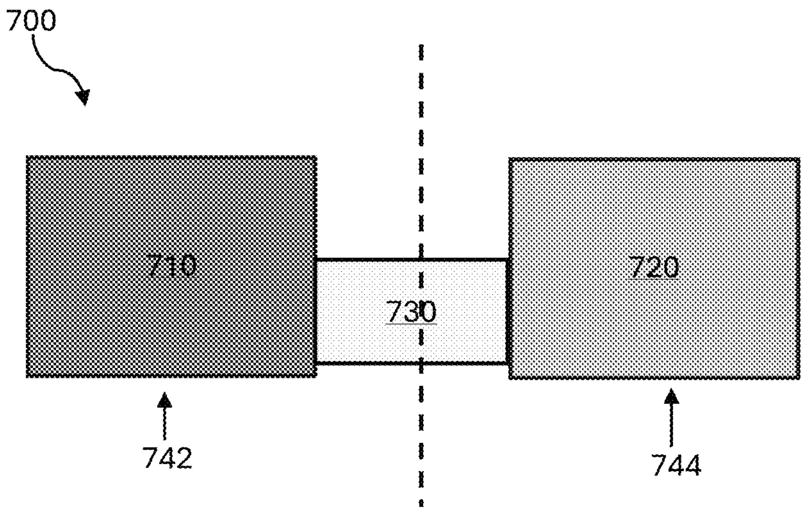
FIG. 7A and FIG. 7B illustrate block diagrams depicting example configurations of a lighting system, in accordance with different embodiments of the present disclosure.
Figure 7B:
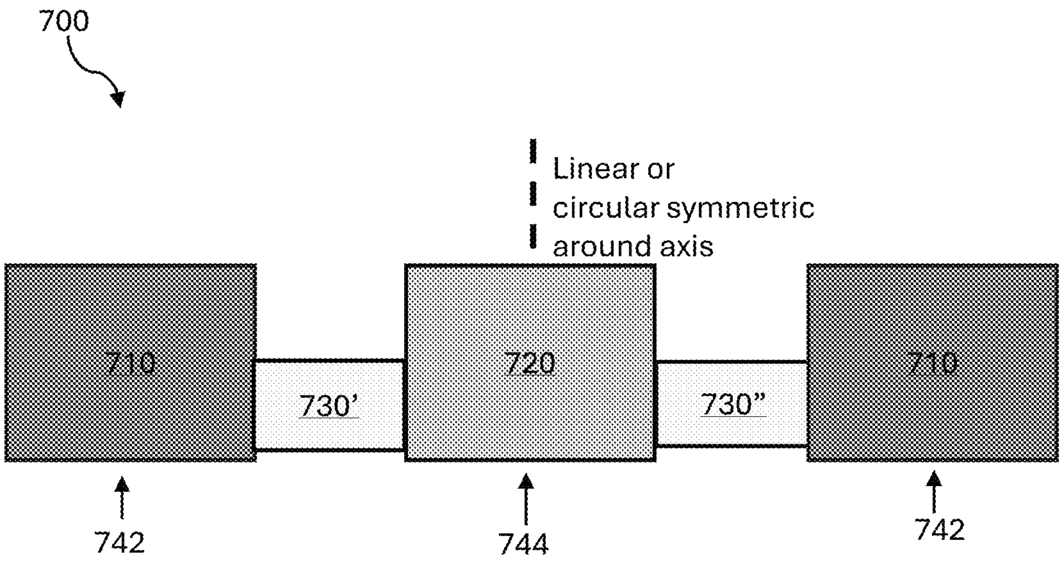

FIG. 7A and FIG. 7B illustrate block diagrams depicting example configurations of a lighting system 700, in accordance with different embodiments of the present disclosure. The lighting system 700 as shown in FIGS. 7A and 7B are similar to that in FIGS. 1A through 1D and includes features with same functionality and structural configurations, except that the lighting system 700 as shown in FIG. 7A includes a single LED assembly 710. Thus, a detailed description of the FIGs, is not incorporated herein for the sake of brevity. The lighting system 700 may include the LED assembly 710, a driver assembly 720, and a connecting member 730 connecting the LED assembly 710 and the driver assembly 720. The lighting system illustrated in FIG. 7A includes the single LED assembly 710 while the lighting system of FIG. 7B includes two LED assemblies 710 arranged on opposite sides of the driver assembly 720.

In FIG. 7A, the LED assembly 710 is designed to be exposed to a first airflow 742 while in FIG. 7B, each of the two LED assemblies 710 is exposed to the first airflow 742. The driver assembly 720 is exposed to a second airflow 744. The lighting system 700 may exhibit linear or circular symmetry about a central axis. As shown in FIG. 7B, the lighting system 700 includes connecting members 730' and 730".

Figure 7C:
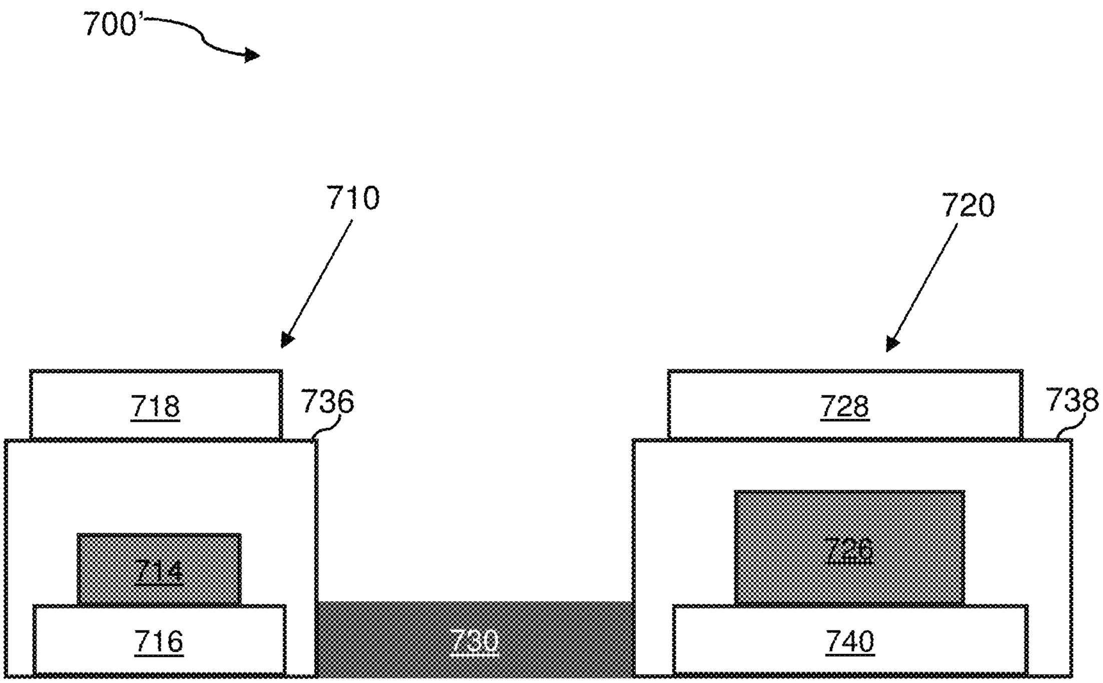
FIG. 7C illustrates a block diagram depicting another example configuration of a lighting system, in accordance with an embodiment of the present disclosure.

FIG. 7C illustrates a block diagram depicting another example configuration of a lighting system 700', in accordance with an embodiment of the present disclosure. The lighting system 700' includes the LED assembly 710, the driver assembly 720 and the connecting member 730. The LED assembly 710 includes an array of LEDs 714 (hereinafter may also be referred to as LEDs 714 or LED 714), a PCB 716 thermally coupled to the LED 714, a first heat sink 718 and a first housing 736 for the LED assembly 710.

The driver assembly 720 may include a second housing 738, a driver 726 (including other electronic components), a PCB 740 thermally coupled to the driver 726, and a second heat sink 728. In an implementation, the first housing 736 and the second housing 738 may be thermally conductive and attached to the first heat sink 718 and the second heat sink 728 respectively. In another implementation, the first housing 736 and the second housing 738 may themselves correspond to the first heat sink 718 and the second heat sink 728 respectively.

FIG. 7A through 7C illustrates (represented by block diagrams) the same concepts as prior FIGS. 1A to 6F, where the connecting member 730 is formed of a geometry and material to provide thermal conduction isolation between the LED assembly 710 and the driver assembly 720. The connecting member 730 is of sufficient length to also provide thermal convection isolation between the first airflow 742 and the second airflow 744.

Figure 8A:
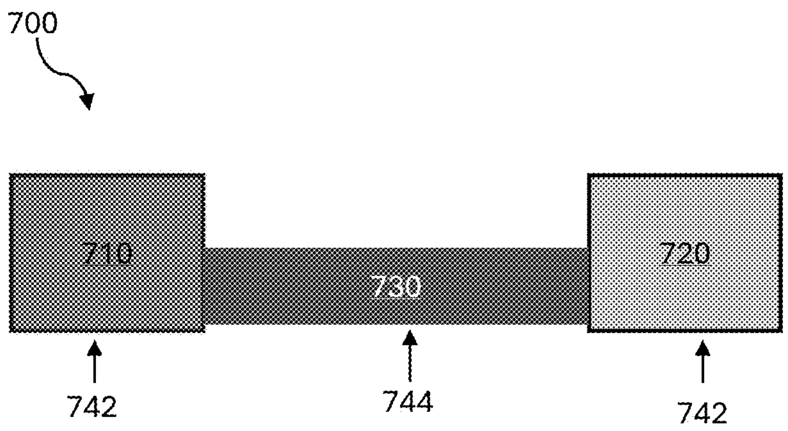
FIG. 8A through FIG. 8C illustrate block diagrams depicting example lighting systems with different configurations of a connecting member, in accordance with different embodiments of the present disclosure.
Figure 8B:
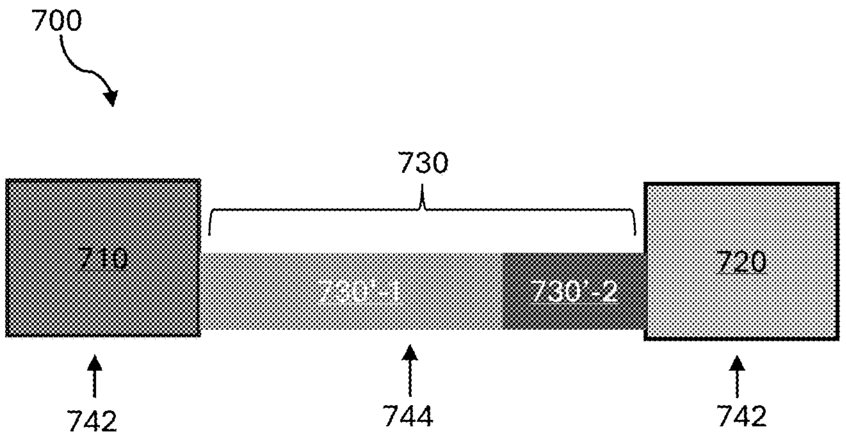
Figure 8C:
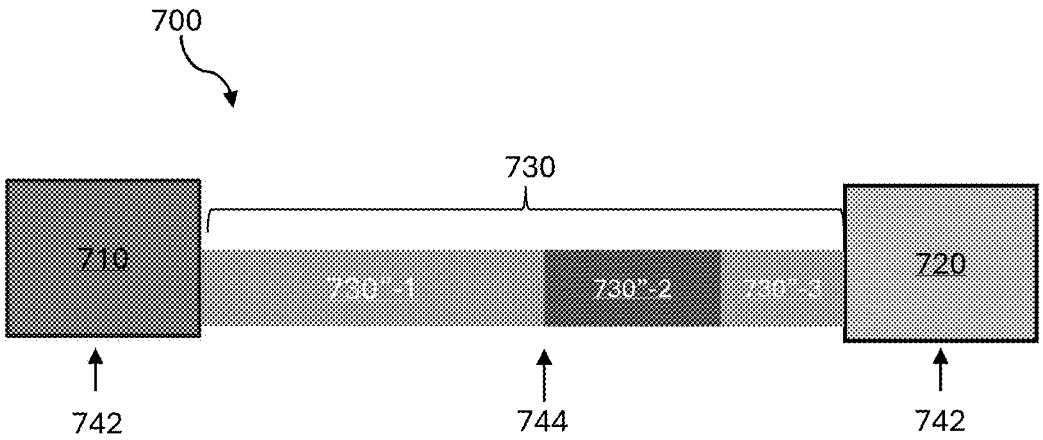

FIG. 8A through FIG. 8C illustrate block diagrams depicting example lighting systems 700 with different configurations of the connecting member 730, in accordance with different embodiments of the present disclosure. The connecting member 730 concept in FIG. 8A to FIG. 8C may apply to any of the prior FIGS. 1A to 7B.

Referring to FIG. 8A, the lighting system 700 includes the LED assembly 710, the driver assembly 720, and the connecting member 730 connecting the LED assembly 710 and the driver assembly 720. The connecting member 730 is formed as a single portion with a low bulk thermal conductivity material. In an example implementation, the low thermal bulk conductivity may be selected from common steel, magnesium alloy, Kovar (FeNiCo alloy), nickel, invar, and the like. In another implementation, the bulk thermal conductivity of the connecting member 730 is less than 60 W/m-K, or even lesser than 10 W/m-K, and preferably lesser than 1 W/m-K. In another implementation, the connecting member 730 is substantially made of a plastic material including but not limited to Polycarbonate, ABS, PET, Acrylic, FR4, and the like. FIGS. 8A through 8C illustrate further embodiments of the lighting system 700 illustrated in FIG. 7A, hence the description of the lighting system 700 in FIG. 7A applies to FIGS. 8A through 8C.

As shown in FIG. 8B, the connecting member 730 includes a first portion 730'-1 adjacent to the LED assembly 710 and a second portion 730'-2 adjacent to the driver assembly 720. The first portion 730'-1 is formed of a material with a higher bulk thermal conductivity than the second portion 730'-2. The second portion 730'-2 may be formed of same or different cross-sectional area as the first portion 730'-1 and is formed of a lower bulk thermal conductivity material such as plastic. In an implementation, the thermal conductivity of the first portion 730'-1 of the connecting member 730' may be greater than 60 W/mK and the thermal conductivity of the second portion 730'-2 plastic material may be lesser than 5 W/mK. In another implementation, the second portion 730'-2 may correspond to a very thin material such a plastic film or plastic washer.

Referring to FIG. 8C, the connecting member 730 includes a first portion 730"-1 adjacent to the LED assembly 710, an intermediate second portion 730"-2 and a third portion 730"-3 adjacent to the driver assembly 720. The first portion 730"-1, the intermediate second portion 730"-2 (hereinafter may also be referred to as a second portion

730"-2) and the third portion 730"-3 may or may not have same cross section area. In an example implementation, the first portion 730"-1 and the third portion 730"-3 are formed of a material with a higher thermal bulk conductivity than the second portion 730"-2. In another implementation, the lower bulk thermal conductivity material forming the second portion 730"-2 may correspond to plastic material.

In one or more embodiments, the bulk thermal conductivity of the material forming the connecting member 730 is lower than the bulk thermal conductivity of the materials used in forming each of the first heat sink, the second heat sink, the driver enclosure, the LED, and the driver. The connecting member may be formed of a plurality of materials, with at least a portion of the connecting member formed of a low bulk thermal conductivity material.

FIG. 9A through FIG. 9F illustrate block diagrams depicting example lighting systems 700 with different configurations of a connecting member 930 (similar to the connecting member 730 of FIG. 7A), in accordance with different embodiments of the present disclosure. The connecting member depicted in FIGS. 9A through 9F is formed of a plurality of portions with varying geometries and bulk thermal conductivities. FIGS. 9A through 9F illustrate further embodiments of the lighting system 700 illustrated in FIG. 7A, hence the description of the lighting system 700 in FIG. 7A applies to FIGS. 9A through 9F.

Figure 9A:
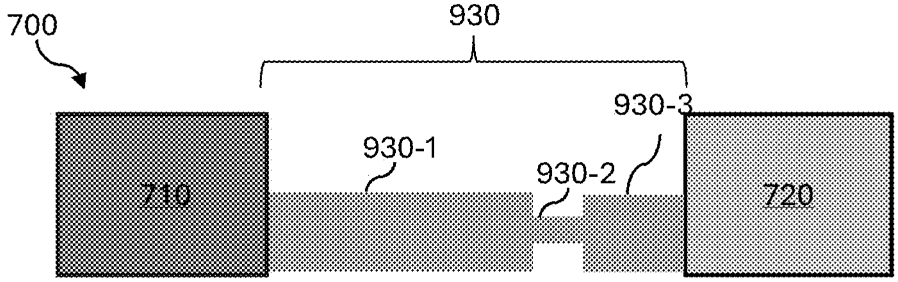
FIG. 9A through FIG. 9F illustrate block diagrams depicting example lighting systems with different configurations of a connecting member, in accordance with different embodiments of the present disclosure.

Referring to FIG. 9A, the lighting system 700 includes the connecting member 930 having a first portion 930-1 adjacent to the LED assembly 710, an intermediate second portion 930-2 (hereinafter may also be referred to as the second portion with reference to FIG. 9A) and a third portion 930-3 adjacent to the driver assembly 720. In an implementation as shown in FIG. 9A, the first portion 930-1, the second portion 930-2 and the third portion 930-3 are all formed of the same material with same bulk thermal conductivity material. In another implementation, the third portion 930-3 may not have same cross section area as the first portion 930-1, while the intermediate second portion 930-2 may be formed as a reduced cross section area than both the first portion 930-1 and 930-2. The reduced cross-sectional area in the connecting member 930 is to create a region of low thermal conductivity or an effective thermal choke point. The net effect of this reduced cross-sectional area is to reduce the net thermal conductivity of the connecting member 930 compared to a connecting member 930 without the second portion 930-2.

Figure 9B:
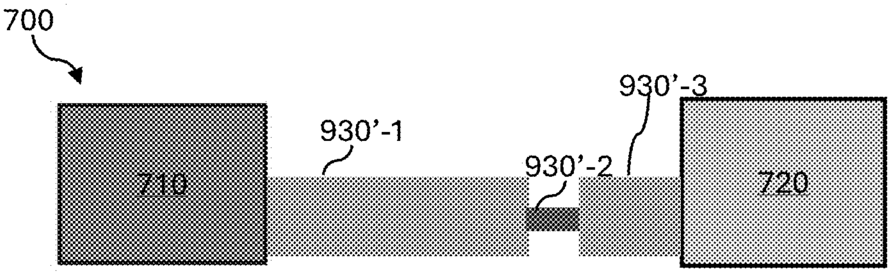

Referring to FIG. 9B, the connecting member 930 includes a first portion 930'-1 (similar to the first portion 930-1 of FIG. 9B) adjacent to the LED assembly 710, an intermediate second portion 930'-2 and a third portion 930'-3 (similar to the third portion 930-3 of FIG. 9A) adjacent to the driver assembly 720. The first portion 930'-1 and the third portion 930'-3 are formed of the same material with a higher bulk thermal conductivity. The intermediate second portion 930'-2 is formed of a lower bulk thermal conductivity material and reduced cross section area to minimize thermal conduction between the LED assembly 710 and the driver assembly 720. The third portion 930'-3 may be formed with a cross section same or different as the first portion 930'-1. The net effect is to reduce the net thermal conductivity of the connecting member than the connecting member without the second portion 930'-2.

Figure 9C:
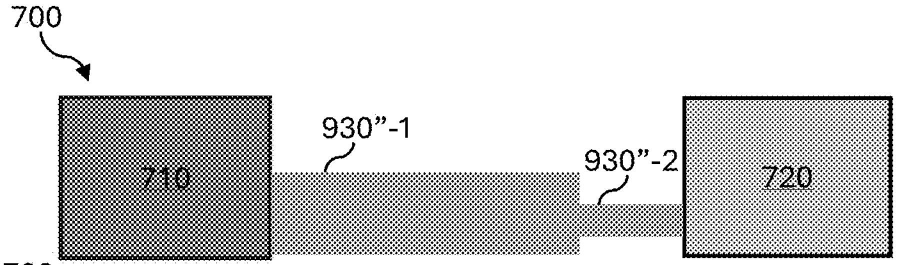

Referring to FIG. 9C, the connecting member 930 includes a first portion 930"-1 adjacent to the LED assembly 710, and a second portion 930"-2 adjacent to the driver assembly 720. The first portion 930"-1 and the second portion 930"-2 are formed of the same material with higher bulk thermal conductivity. The second portion 930"-2 is formed of reduced cross section area to minimize thermal conduction between the LED assembly 710 and the driver assembly 720. The net effect is to reduce the net thermal conductivity of the connecting member than the connecting member without the second portion 930"-2.

Figure 9D:
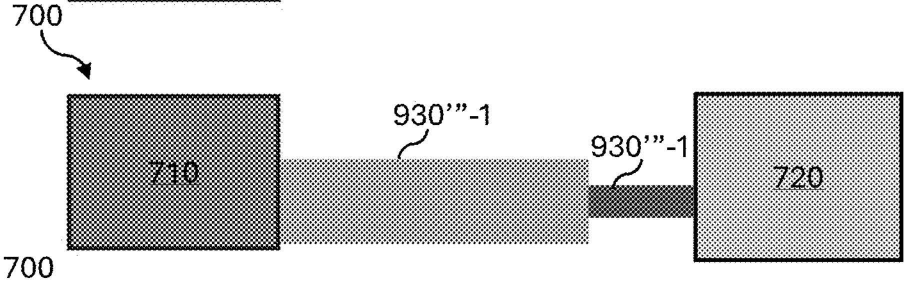

Referring to FIG. 9D, the connecting member 930 includes a first portion 930"-1 adjacent to the LED assembly 710, and a second portion 930'"-2 adjacent to the driver assembly 720. The first portion 930'"-1 is formed of the material with a higher bulk thermal conductivity. The second portion 930'"-2 is formed of a lower bulk conductivity material and reduced cross section area to minimize thermal conduction between the LED assembly 710 and the driver assembly 720.

Figure 9E:
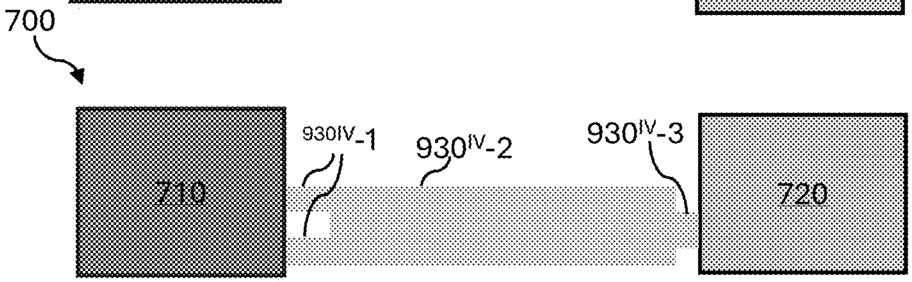

Referring to FIG. 9E, the connecting member 930 includes a first portion $\mathbf{930^{IV}}$-1 adjacent to the LED assembly 710, an intermediate second portion $\mathbf{930^{IV}}$-2, and a third portion $\mathbf{930^{IV}}$-3 adjacent to the driver assembly 720. The first, second and the third portions are all formed of the material with higher bulk thermal conductivity. The first portion $\mathbf{930^{VI}}$-1 is formed in two portions with reduced cross section area to minimize thermal conduction between the LED assembly 710 and the driver assembly 720. The third portion $\mathbf{930^{IV}}$-3 is formed with reduced cross section area to minimize thermal conduction between the LED assembly 710 and the driver assembly 720. The first portion $\mathbf{930^{IV}}$-1 and the third portion $\mathbf{930^{IV}}$-3 may be formed as a rough surface including bumps to reduce contact area between the first portion $\mathbf{930^{IV}}$-2 to the LED assembly 710 or between the third portion $\mathbf{930^{IV}}$-3 and the driver assembly 720.

Figure 9F:
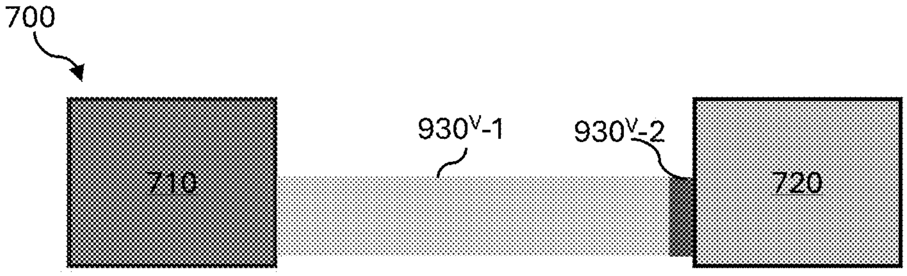

Referring to FIG. 9F, the connecting member 930 includes a first portion $\mathbf{930^{V}}$-1 adjacent to the LED assembly 710, and a second portion $\mathbf{930^{V}}$-2 adjacent to the driver assembly 720. The first portion $\mathbf{930^{V}}$-1 is formed of a material with a higher bulk thermal conductivity. The second portion $\mathbf{930^{V}}$-2 is formed of same cross section area (not necessarily) as the first portion $\mathbf{930^{V}}$-1 and of lower bulk thermal conductivity material. In an implementation, the lower bulk thermal conductivity material may correspond to a plastic material for instance, plastic washer, plastic film, and the like. The net effect is to reduce the net thermal conductivity of the connecting member than the connecting member without the second portion $\mathbf{930^{V}}$-2.

In one or more implementations as referred to in FIGS. 9A through 9F, the connecting member 930 may comprise at least a portion formed as a constricted section in a thermal conduction cross-sectional profile to restrict a flow of heat through the connecting member 930. In another example implementation, the connecting member 930 may be formed of a lower bulk thermal conductivity material or a combination of materials to reduce or thermally isolate the heat conduction between the LED assembly 710 and the driver assembly 720. The connecting member 930 may include a higher bulk thermal conductivity material with at least a portion of the connecting member 930 formed of the lower bulk thermal conductivity member. In one implementation, the low bulk thermal conductivity material corresponds to a plastic material. In an example implementation, the low bulk thermal conductivity material may be a part of an optic of the LED assembly 710.

In another implementation, the net thermal conductivity of the connecting member is less than 5 W/K, or less than 10 W/K or thermal resistance of the connecting member is greater than 0.1 K/W or 0.2 K/W. In an example implementation, at least one portion of the one of more portions of the connecting member forms a high thermal contact resistance interface with at least one of other portion of the one of more portions, the LED assembly 710, or the driver assembly 720

Figure 10A:
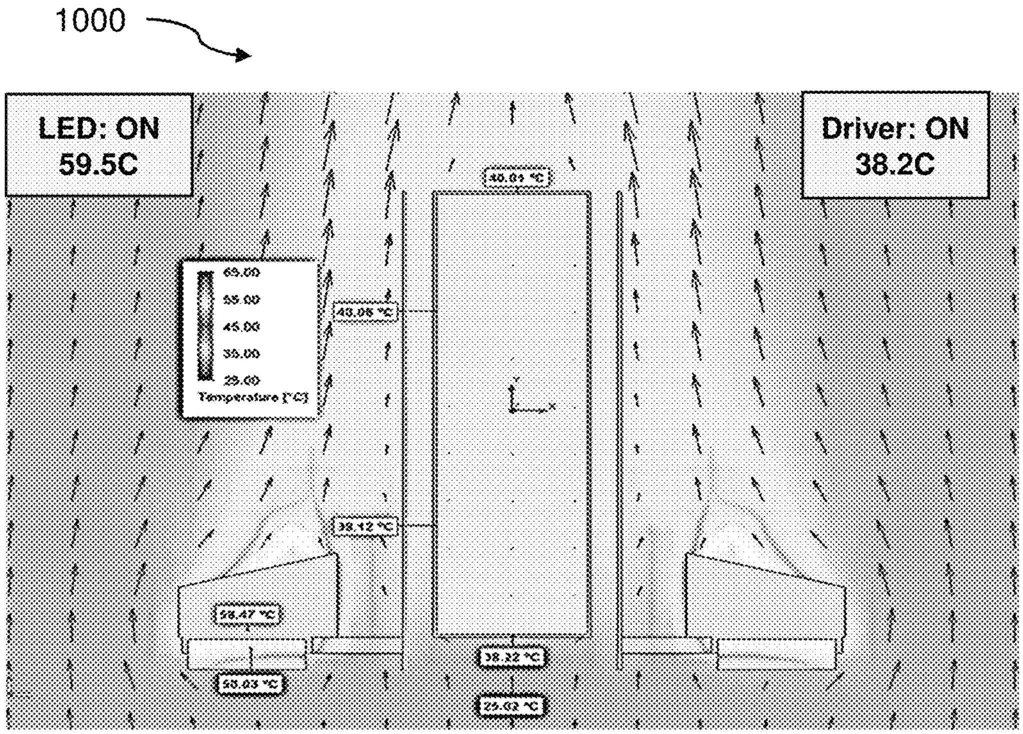
FIG. 10A illustrates a graphical representation of results of an exemplary thermal analysis of the lighting system as shown in FIG. 6C, in accordance with an embodiment of the present disclosure.
Figure 10A:
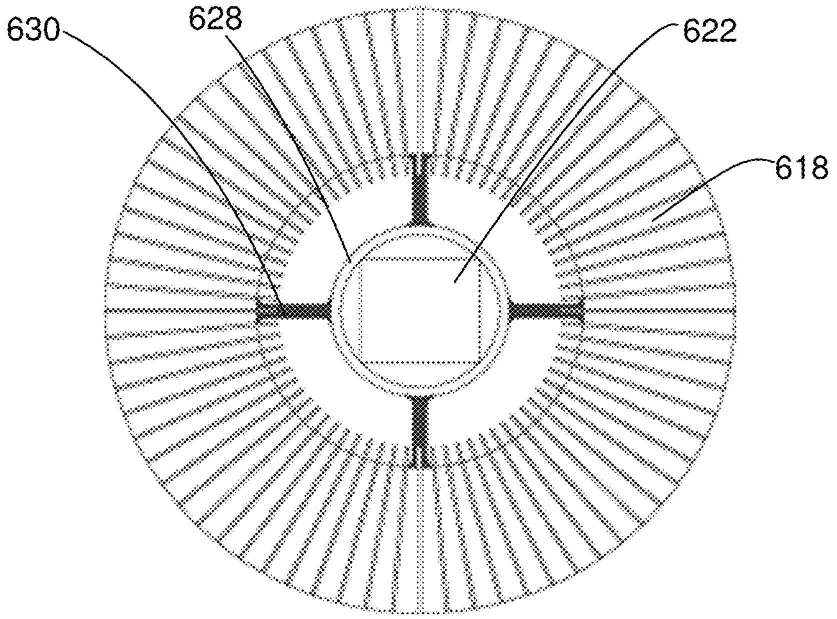

FIG. 10A illustrates a graphical representation 1000 of results of an example thermal analysis of the lighting system 600 (as shown in FIG. 6C), in accordance with an embodiment of the present disclosure. When the LED of the LED assembly and the driver of the driver assembly are in a power ON state during an operation of the lighting system 600 including the connecting member 630 (formed of the plurality of low bulk thermal conductivity members, herein four low thermal conductivity members i.e., plastic members), the temperature at the bottom of the driver assembly is 38.22° C., temperature of a sensor is 40.06° C., and of the fins surrounding the LEDs is 59.47° C. Further, as observed during simulation studies, when the LED is powered OFF i.e., disconnected from the lighting system 600, the temperature of the driver is 36.2° C. (due to its own generated heat). When the LED is turned ON, the driver temperature is 38.2° C. and thus, the LED heats the driver by approximately 2° C. Referring to FIG. 10A, the connecting member 630 is formed of four low thermal conductivity members i.e., plastic members. Since the connecting member 630 is formed of the low conductivity members, effective thermal isolation between the LED and the driver is achieved compared to a case where the connecting member is formed of four metal members, where the rise in driver temperature is approximately 15° C., which is much higher than the rise in driver's temperature (2° C.) in the present case. Thus, the temperature of the driver drops by approximately 10° C. compared to a case where the connecting member is formed of four metal members. This drop in temperature of the driver can result in an increase (almost double) in the relative life of the driver. In an implementation, with a drop in the temperature of the driver by approximately 10° C., the life of the driver increased by approximately 192%.

Figure 10B:
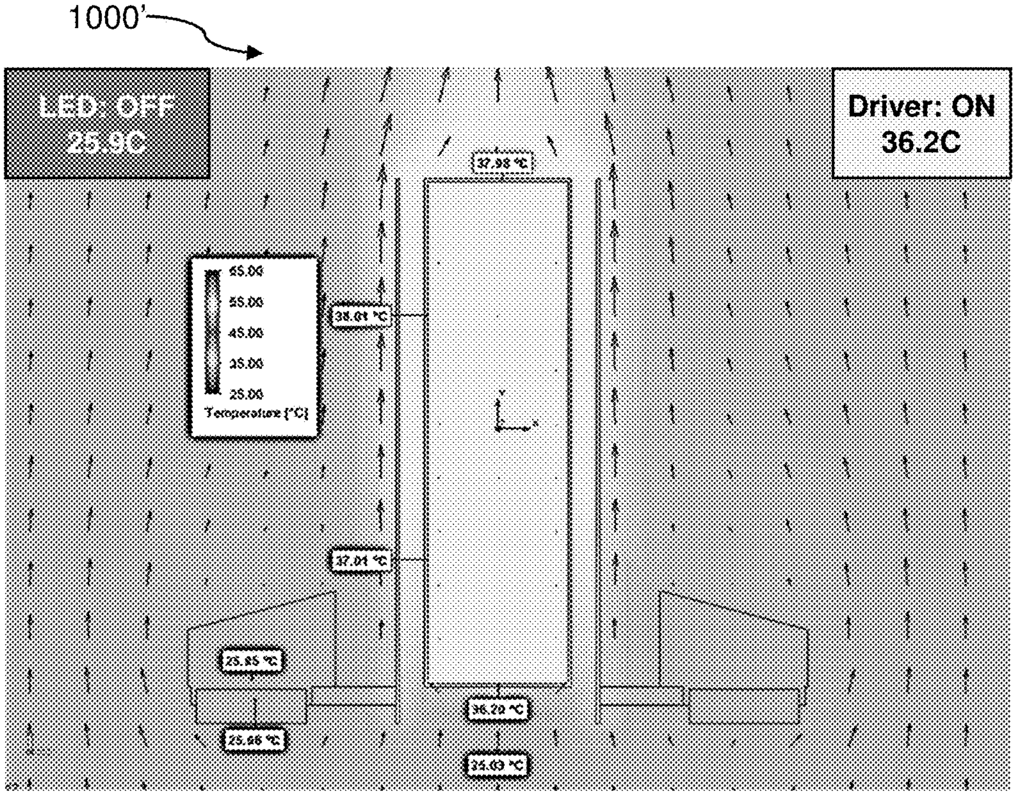
FIGS. 10B and 10C illustrate graphical representations of results of another exemplary thermal analysis of the lighting system as shown in FIGS. 6A and 6B respectively, in accordance with different embodiments of the present disclosure.
Figure 10B:
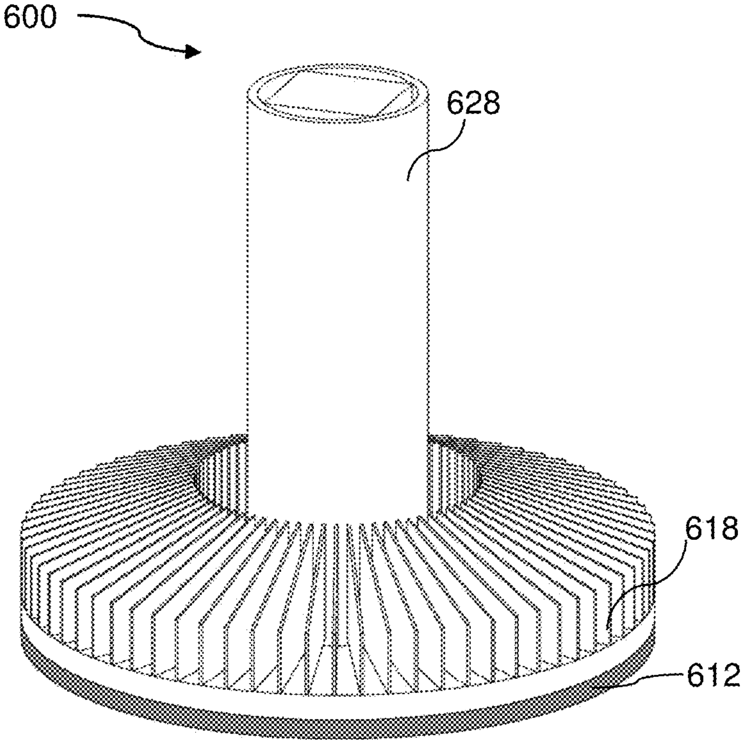
Figure 10C:
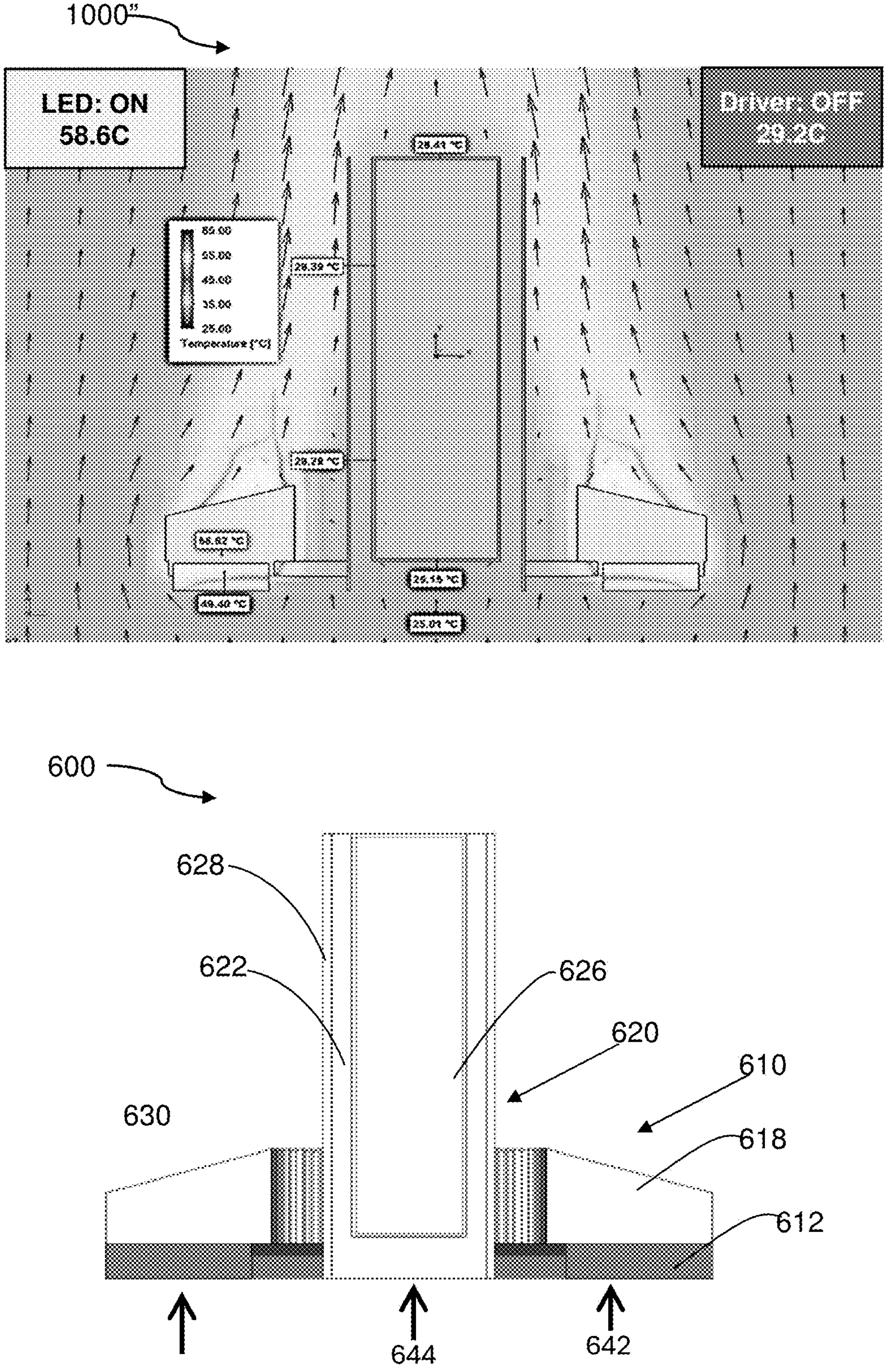

FIGS. 10B and 10C illustrates graphical representations 1000', 1000" of results of exemplary thermal analysis of the lighting system 600 (as shown in FIGS. 6A and 6B), in accordance with different embodiments of the present disclosure.

Referring to FIG. 10B, when the driver is ON and the LED of the lighting system 600 including the connecting member formed of the plurality of low conductivity members is powered OFF, the driver heats the LED by 0.9° C. over ambient temperature. The connecting member is formed of four low thermal conductivity members i.e., plastic members, resulting in effective thermal isolation between the LED and the driver compared to a case where the connecting member is formed of four metal members, where the rise in driver temperature is approximately 3.7° C., which is much higher than the rise in driver's temperature (0.9° C.) in the present case.

Referring to FIG. 10C, when the driver is OFF and the LED of the lighting system including the connecting member formed of the plurality of insulting members is ON, the LED heats the driver by 4.2° C. over the ambient temperature. Since the connecting member is formed of four low thermal conductivity members i.e., plastic members, effective thermal isolation between the LED and the driver results compared to a case where the connecting member is formed of four metal members, where the rise in driver temperature is approximately 17.6° C., which is much higher than the rise in driver's temperature (4.2° C.) in the present case.

Thus, in case of a lighting system including the connecting member formed of the plurality of low bulk thermal conductivity members for instance, plastic members, when the LED is powered ON from an external power source and the driver is turned ON, an increase in temperature of the driver is less than one of 10° C. or 5° C.

In another implementation of a lighting system, the LED of the LED assembly and the driver of the driver assembly are initially in a powered-off condition and the driver has an initial temperature. The LED is powered on by an external power source and the driver remains in the powered-off state, allowing the lighting system to reach a steady operational condition. In the steady operational condition, the driver assembly reaches a final temperature, and in at least one portion of the driver, the difference between the initial temperature and the final temperature is less than at least one of 5° C., 7° C., or 10° C.

It is contemplated that any of the foregoing aspects, and/or various separate aspects and features as described herein, may be combined for additional advantage. Any of the various embodiments as disclosed herein may be combined with one or more other disclosed embodiments unless indicated to the contrary herein.

Those skilled in the art will recognize improvements and modifications to the preferred embodiments of the present disclosure. All such improvements and modifications are considered within the scope of the concepts disclosed herein and the claims that follow.

While various embodiments of the present invention have been described above, it should be understood that they have been presented by way of example, and not limitation. It will be apparent to one skilled in the relevant art(s) that various changes in form and detail can be made therein without departing from the spirit and scope of the invention. Thus, the present invention should not be limited by any of the above-described exemplary embodiments, but should be defined only in accordance with the following claims and their equivalents.

It is to be understood that, if any prior art publication is referred to herein, such reference does not constitute an admission that the publication forms a part of the common general knowledge in the art, in Australia or any other country.

It will be understood to persons skilled in the art of the invention that many modifications may be made without departing from the spirit and scope of the invention.

What is claimed is:

1. A lighting system comprising:

a Light Emitting Diode (LED) assembly including one or more LEDs;

a driver assembly including a driver that powers the one or more LEDs, wherein each of the one or more LEDs and the driver generates heat when in operating condition; and a connecting member connecting the LED assembly and the driver assembly, the connecting member being adapted to minimize thermal conduction between the LED assembly and the driver assembly, wherein the LED assembly is designed to be exposed to a first airflow that dissipates heat from the LED assembly and the driver assembly is designed to be exposed to a second airflow that dissipates heat from the driver assembly, and wherein an ambient air source for the second airflow is substantially separated from the heated air from the first airflow to minimize a thermal convection coupling of the first airflow to the second airflow.

2. The lighting system of claim 1, further comprising an arrangement including at least one of:

an LED assembly positioned at least partially surrounding a driver assembly;

an LED assembly positioned adjacent to a driver assembly; or at least two LED assemblies positioned on opposite sides of a driver assembly.

3. The lighting system of claim 1, wherein a heated air from the second airflow forms at least a portion of the first airflow impinging on the LED assembly.

4. The lighting system of claim 1, further comprising:

a first heat sink corresponding to the LED assembly; and a second heat sink corresponding to the driver assembly, wherein the first airflow is directed across the first heat sink of the LED assembly, and the second airflow is directed across the second heat sink of the driver assembly, wherein the second heat sink is positioned substantially above the first heat sink, and wherein the second airflow is substantially isolated in convection from the first airflow.

5. The lighting system of claim 1, wherein the connecting member is configured to be formed of one of more portions to minimize the thermal conduction between the LED assembly and the driver assembly, and wherein at least one portion of the one of more portions is formed of a low bulk thermal conductivity material.

6. The lighting system of claim 5, wherein at least one portion of the one or more portions of the connecting member is formed with a constricted cross section profile.

7. The lighting system of claim 5, wherein at least one portion of the one of more portions of the connecting member forms a high thermal contact resistance interface with at least one of other portion of the one of more portions, the LED assembly, or the driver assembly.

8. The lighting system of claim 5, wherein the low bulk thermal conductivity material corresponds to a plastic material.

9. The lighting system of claim 5, where the low bulk thermal conductivity material is a part of an optic of the LED assembly.

10. The lighting system of claim 1, wherein a thermal conductivity of the connecting member is lesser than at least one of 5 W/K or 10 W/K.

11. The lighting system of claim 1, wherein the LED assembly and the driver assembly are physically separated forming a separation area having a first portion comprising of the connecting member and a second portion comprising of at least an airgap.

12. The lighting system of claim 11, wherein the second portion of the separation area corresponds to at least one of 90%, 80%, 70% or 60% of the separation area.

13. The lighting system of claim 1, wherein each of the one or more LEDs of the assembly and the driver of the driver assembly are initially in a powered-off condition, the driver having an initial temperature, each of the one or more LEDs is powered on by an external power source and the driver remains in the powered-off state, allowing the lighting system to reach a steady operational condition, in the steady operational condition, the driver reaches a final temperature, and in at least one portion of the driver, the difference between the initial temperature and the final temperature is less than at least one of 5° C., 7° C., or 10° C.

14. The lighting system of claim 1, wherein the driver assembly is at a lower temperature than the LED assembly.

* * * * *